United States Patent [19]

Harada

[11] Patent Number: 5,723,960
[45] Date of Patent: Mar. 3, 1998

[54] METHOD OF AND APPARATUS FOR OPENING/CLOSING CONTROL OF MOTOR-DRIVEN OPENING/CLOSING MEMBER OF VEHICLE

[75] Inventor: Kouichi Harada, Hyogo, Japan

[73] Assignee: Mitsubishi Denki Kabushiki Kaisha, Tokyo, Japan

[21] Appl. No.: 512,701

[22] Filed: Aug. 8, 1995

[30] Foreign Application Priority Data

Apr. 25, 1995 [JP] Japan ................................ 7-101493

[51] Int. Cl.⁶ ................................................ E05F 15/16
[52] U.S. Cl. .................... 318/469; 318/282; 318/285; 49/139; 49/349; 49/28; 361/57
[58] Field of Search ........................ 318/615, 616, 318/629, 632, 285, 469, 626, 468, 466, 286, 282; 49/139, 31, 280, 348, 349, 501, 28; 361/31, 54, 57

[56] References Cited

U.S. PATENT DOCUMENTS

| | | |
|---|---|---|
| 4,002,948 | 1/1977 | Gary et al. |
| 4,520,304 | 5/1985 | Curran, Jr. ........................ 318/800 |
| 4,639,609 | 1/1987 | Floyd et al. ........................ 307/10 R |
| 5,334,876 | 8/1994 | Washeleski et al. ........................ 318/469 |
| 5,399,950 | 3/1995 | Lu et al. ................................ 318/626 |
| 5,471,035 | 11/1995 | Holmes ................................ 219/505 |

FOREIGN PATENT DOCUMENTS

| | | |
|---|---|---|
| 3532078 A1 | 4/1986 | Germany. |
| 4312865 A1 | 11/1993 | Germany. |
| 1-37291 | 8/1989 | Japan. |

*Primary Examiner*—John W. Cabeca
*Attorney, Agent, or Firm*—Sughrue, Mion, Zinn, Macpeak & Seas, PLLC

[57] ABSTRACT

An opening/closing control apparatus detects an overload placed on a movable member of a vehicle such as a sunroof and a power window while it is sliding. Further, it prevents overload detecting operation (reversing motion) from being made by a cause other than an overload. A control processor circuit compares a driving current value of a motor detected at predetermined intervals with a preset current value and corrects an overload threshold value to a threshold value of higher value when the driving current value detected when a first predetermined time period has passed after the start of the motor does not exceed the preset current value. Thereafter, the control processor circuit determines that an overload has occurred when a change in the driving current value has exceeded the overload threshold value.

17 Claims, 19 Drawing Sheets

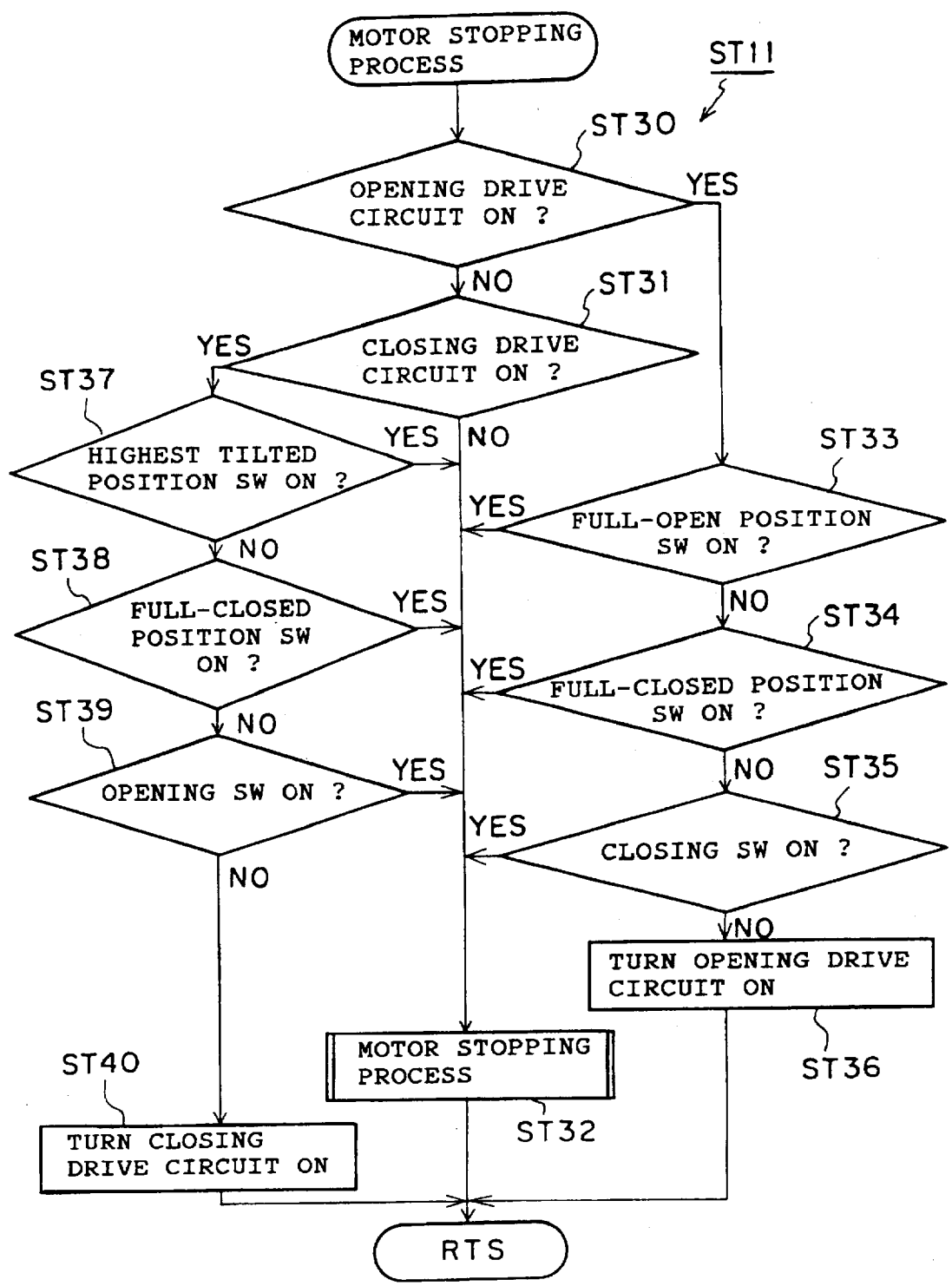

METHOD OF AND APPARATUS FOR OPENING/CLOSING CONTROL OF MOTOR-DRIVEN OPENING/CLOSING MEMBER OF VEHICLE

BACKGROUND OF THE INVENTION

1. Field of the Invention

The present invention relates to a method of and an apparatus for positively controlling opening and closing operations of a motor-driven closing/opening member such as the sunroof, power window or the like of vehicle.

2. Description of the Prior Art

FIG. 22 is a circuit diagram showing a safety apparatus for an automobile sunroof to which an opening/closing control apparatus of a motor-driven opening/closing member of a vehicle of a prior art disclosed in Japanese Patent Laid-open No. Hei 1-37291 is applied. Referring to FIG. 22, reference numeral 11 denotes a motor for driving a sunroof panel of the sunroof as a motor-driven opening/closing member of a vehicle. Reference numeral 30 denotes a drive circuit for the motor 11 and it includes relay contacts 31 and 32 for switching power circuits for the motor 11 and relay coils 33 and 34 for driving the relay contacts 31 and 32. Reference numeral 40 denotes a series resistor connected in series with the motor 11 for detecting the driving current of the motor 11 and 50 denotes a switch for outputting an opening/closing starting signal of the sunroof panel. Reference numeral 60 denotes a filter circuit for eliminating the high-frequency components of the voltage generated between both ends of the series resistor 40, 70 denotes an amplifier for amplifying the output signal of the filter circuit 60, 80 denotes an adder circuit for establishing an over current value by adding a predetermined value to an output signal VS of the amplifier 70, and 90 denotes a delay circuit for delaying one output signal VD of the adder circuit 80.

Reference numeral 100 denotes an overload detector circuit receiving the output signal VS of the amplifier 70 and an output signal VDO of the delay circuit 90 for detecting an overload on the motor 11. The overload detector circuit 100 includes comparators 101 and 102 and a transistor 103 for signal driving. Reference numeral 110 denotes a storage circuit receiving the other output signal VM of the adder circuit 80 for storing the current value (threshold value) in an overload state. The storage circuit 110 includes a buffer 111, a hold capacitor 112, a switching transistor 113, and a comparator 114. Reference numeral 120 denotes a stopping circuit for stopping the motor 11 and it includes switching transistors 121 and 122. Reference numeral 130 denotes a reversing circuit for reversing the rotation of the motor 11 and it includes a timer-driven transistor 131. Reference numeral 140 denotes a detector circuit for detecting a sunroof panel closing signal from the switch 50 and it includes a transistor 141. Reference numeral 150 denotes a masking circuit for masking the rush current generated at the start of the motor 11.

Now, operations will be described. When the switch 50 is turned to the closing side for closing the sunroof panel, the transistor 141 of the detector circuit 140 is turned off and the switching transistor 122 of the stopping circuit 120 is turned on. Then, current flows through the relay coil 34 of the drive circuit 30. Thereby, the relay contact 32 is connected to the ground side and the motor 11 is started to be driven.

When the motor 11 is driven, the driving current flows through the series resistor 40 and a voltage due to the voltage drop is generated between the both ends of the resistor 40. The generated voltage is sent as the driving current signal of the motor 11 to the filter circuit 60. The driving current signal is input to the amplifier 70 after high-frequency noise components of the signal are eliminated by the filter circuit 60. The output signal VS of the amplifier 70 is supplied to the adder circuit 80 and also to the overload detector circuit 100. The adder circuit 80 adds a predetermined value to the input signal VS and generates and outputs the signal VD and the signal VM. The signal VD is delayed for a predetermined period of time in the delay circuit 90 to become the signal VDO and the signal VDO is supplied to the overload detector circuit 100. The other signal VM is input to the storage circuit 110.

When the switch 50 is turned to the closing side, the timer of the masking circuit 150 is operated. Two kinds of output signals V200 and V300 corresponding to timer operating times (200 ms and 300 ms) are generated by the masking circuit 150 and both the signals are input to the storage circuit 110. The signal V300 corresponding to the timer operating time 300 ms is input to the switching transistor 113 and turns off the switching transistor 113. On the other hand, the signal V200 corresponding to the timer operating time 200 ms is input to the + terminal of the comparator 114 and brings the output of the comparator 114 to the ground level.

Accordingly, the hold capacitor 112 of the storage circuit 110 is held at the ground level until 200 ms passes after the start of the motor 11. Further, the hold capacitor 112 is charged up to the VM level during the period between the point at which 200 ms has passed and the point at which 300 ms passes. Thus, the voltage value on the hold capacitor 112 becomes a threshold value VMC. The threshold value VMC is supplied to the overload detector circuit 100. In the overload detector circuit 100, the output signal VS of the amplifier 70 is normally lower than the threshold value VMC and the output signal VDO of the delay circuit 90. Hence, no detection signal is output from the overload detector circuit 100. Accordingly, the stopping circuit 120 and the reversing circuit 130 do not operate.

Now, the operation made under the condition that an overload occurs while the sunroof panel is sliding will be described. In this case, an overcurrent flows through the motor 11. Hence, since the voltage drop between the both ends of the series resistor 40 increases, the output voltage VS of the amplifier 70 rises. As the signal VDO is delayed by the delay circuit 90, the signal VDO rises slower than the signal VS. Accordingly, there exists such a time period during which the signal VS is higher than the signal VDO. Further, since the output signal VS of the amplifier 70 goes higher, the output signal VS comes to exceed the threshold value VMC. When the output signal VS of the amplifier 70 becomes higher than either of the signal VDO and the threshold value VMC, either or both of the comparators 101 and 102 in the overload detector circuit 100 are brought to the ground level. As a result, the transistor 103 is turned off.

The turning off of the transistor 103 causes the switching transistor 121 of the stopping circuit 120 to turn on and the switching transistor 122 to turn off. The turning off of the switching transistor 122 cuts off the current flowing through the relay coil 34 of the drive circuit 30. Accordingly, the relay contact 32 is turned off and the motor 11 is cut off from the supply of the driving current and stops. Further, since the switching transistor 121 is turned on, the output signal of the comparator circuit 132 causes the switching transistor 131 of the reversing circuit 130 to turn on. Accordingly, the timer of the reversing circuit 130 is started and current flows through the relay coil 33 of the drive circuit 30. As a result, the relay contact 31 is connected to the ground side while the timer of the reversing circuit 130 is operating. Accordingly, a reverse driving current is supplied to the motor 11 and the motor 11 is reversely rotated.

The sliding load of the sunroof panel depends on ambient temperature and aged deterioration due to dusts and the like. Namely, when the ambient temperature falls, the grease existing at the sliding portion of the sunroof panel is hardened to increase the sliding resistance. Also in a dusty environment, the sliding resistance of the sunroof panel increases by foreign matter intruding into the sliding portion. Further, variations of the resistance value (irregularities of the sliding resistance value) from place to place of the sliding portion also increase. As the sliding resistance increases, the driving current value of the motor 11 becomes greater, and as the variations of the sliding resistance increase, changes in the current flow become greater.

Further, in the case where the load on the motor 11 is increased by low temperature, or when the load on the motor 11 is increased by aged deterioration due to dusty environment, if the voltage applied to the motor 11 is not high, the torque of the motor 11 decreases and the revolving speed of the motor 11 is lowered. Then, the sliding speed of the sunroof panel is decreased and longer time is required for changing the driving current of the motor 11 under the overload condition.

Therefore, in a low temperature state where the number of revolutions of the motor 11 decreases, in a high sliding load state caused by aged deterioration due to accumulation of dusts or the like, or in a low voltage state, the increase in the sunroof sliding time when foreign matter intrudes into the sunroof is liable to become longer than the delay time in the delay circuit 90. In such case, the output signal VS of the amplifier 70 does not exceed the output signal VDO of the delay circuit 90 even when there exists intrusion of foreign matter in the sunroof. Further, as described above, the distribution of the sliding load of the sunroof does not become even in a low temperature state or in a high sliding load state. Hence, the variations in the current flow through the motor 11 become greater and it sometimes occurs that the signal VS exceeds the threshold value VMC even when there is created no overload state. In such case, an erroneous reversing operation is made. Further, when the engine is put into its starting state (cranking state) while the sunroof is in motion, the voltage of the battery 1 suddenly falls as shown in FIG. 5. Then, the current flowing through the motor 11 sharply restores with the recovery of the voltage upon completion of the starting of the engine. Thus, sometimes a malfunction is caused by the output signal VS exceeding the signal VDO on account of the increase of the current flow in the recovery stage.

SUMMARY OF THE INVENTION

The present invention has been made to overcome the above described problems with the related art. Accordingly, it is an object of the invention to provide a method of controlling opening/closing member of a vehicle and an apparatus for the control whereby intrusion of foreign matter into a motor-driven opening/closing member, such as the sunroof, while it is sliding can be positively detected and the member can be prevented from making malfunctions.

The method of controlling a motor-driven opening/closing member of a vehicle according to the invention comprises the steps of detecting a driving current of a motor at predetermined detecting intervals, calculating a change in the driving current at each of the detecting intervals, comparing the change with a previously set overload threshold value and stopping the motor or stopping the motor after reversing the same when the change is not smaller than the overload threshold value, and determining the detecting interval or the overload threshold value on the basis of operating conditions of the motor or environmental conditions.

In an aspect of the step of determining the overload threshold value, the driving current value detected at the time when a first predetermined time period (an operation masking period) has past after the start of the motor is compared with a previously set current value and the overload threshold value is corrected to a higher value when the driving current value is equal to or larger than the preset current value.

In another aspect of the step of determining the overload threshold value, ambient temperature is compared with a previously set temperature and the overload threshold value is corrected to a higher value when the ambient temperature does not exceed the preset temperature.

In an aspect of the step of determining the detecting interval, applied voltage to the motor, driving current of the motor, and ambient temperature are compared with preset voltage value, preset current value, and preset temperature value, respectively, and the detecting interval is corrected to a longer interval when either of the applied voltage and the ambient temperature is smaller than the preset value or when the driving current is equal to or larger than the preset value.

In an aspect of the step of comparing the change in the current with a threshold value, when a change in the current detected at a second detecting interval longer than the predetermined detecting interval is smaller than a previously set value, the detected change in the current is canceled, and when the change in the current is not smaller than the previously set value, the change in the current is maintained and a change in the current subsequently detected is added to the maintained value.

In an aspect of the step of determining the detecting interval, the predetermined interval and the second interval longer than the same are determined on the basis of the ambient temperature of the opening/closing member of a vehicle.

In another aspect of the step of determining the detecting interval, the predetermined interval and the second interval longer than the predetermined interval are determined on the basis of the voltage applied to the motor.

In a further aspect of the step of determining the detecting interval, the predetermined interval and the second interval longer than the predetermined interval are determined on the basis of the driving current for the motor.

The method of controlling a motor-driven opening/closing member of a vehicle according to another aspect of the invention includes the step of stopping the motor or inhibiting execution of overload detection when the voltage applied to the motor and the driving current for the motor have become smaller than previously set values taking the events as indications of occurrence of cranking.

The method of controlling a motor-driven opening/closing member of a vehicle according to a further aspect of the invention includes the step of stopping the motor or inhibiting execution of overload detection when decreases in the voltage applied to the motor and the driving current for the motor have reached or exceeded previously set values taking the events as indications of occurrence of cranking.

The method of controlling a motor-driven opening/closing member of a vehicle according to still another aspect of the invention includes the step of detecting a make signal of a starter switch to thereby determine whether cranking has occurred and stopping the motor or inhibiting execution of overload detection when cranking has occurred.

The apparatus for controlling a motor-driven opening/closing member of a vehicle according to the invention comprises a motor for opening/closing driving the opening/closing member of a vehicle, current detection means for detecting a driving current for the motor, and a control circuit calculating a change in the driving current detected by the current detection means at predetermined detecting intervals, outputting a stop signal to cause the motor to stop or a reverse signal to cause the motor to reverse when the change has exceeded a previously set overload threshold value, and comparing the driving current value detected when a predetermined period has passed after the start of the motor with a previously set value for correcting the overload threshold value to a higher value when the driving current value is not smaller than the preset current value.

The apparatus for controlling a motor-driven opening/closing member of a vehicle according to another aspect of the invention includes a temperature detector for detecting ambient temperature and the control circuit accepts the ambient temperature detected by the temperature detector and compares the ambient temperature with a previously set temperature for correcting the overload threshold value to a higher value when the ambient temperature is lower than the preset temperature.

In the apparatus for controlling a motor-driven opening/closing member of a vehicle according to a further aspect of the invention, the control circuit determines that cranking has occurred when values of the voltage applied to the motor and the driving current for the motor have become lower than previously set values.

In the apparatus for controlling a motor-driven opening/closing member of a vehicle according to still another aspect of the invention, the control circuit determines that cranking has occurred when decreases in the voltage applied to the motor and the driving current for the motor have reached or exceeded previously set values.

The apparatus for controlling a motor-driven opening/closing member of a vehicle according to a still further aspect of the invention includes a detector circuit for detecting a make state of a starter switch and the control circuit determines occurrence of cranking according to a make signal detected by the detector circuit.

BRIEF DESCRIPTION OF THE DRAWINGS

FIG. 8 is a flowchart showing a motor stopping process;

FIG. 15(a), FIG.15(b), and FIG.5(c) are diagrams each showing relationship between the change in the driving current for a motor and predetermined time intervals $\Delta T$;

DETAILED DESCRIPTION OF THE PREFERRED EMBODIMENTS

Embodiment 1

Figure 1:
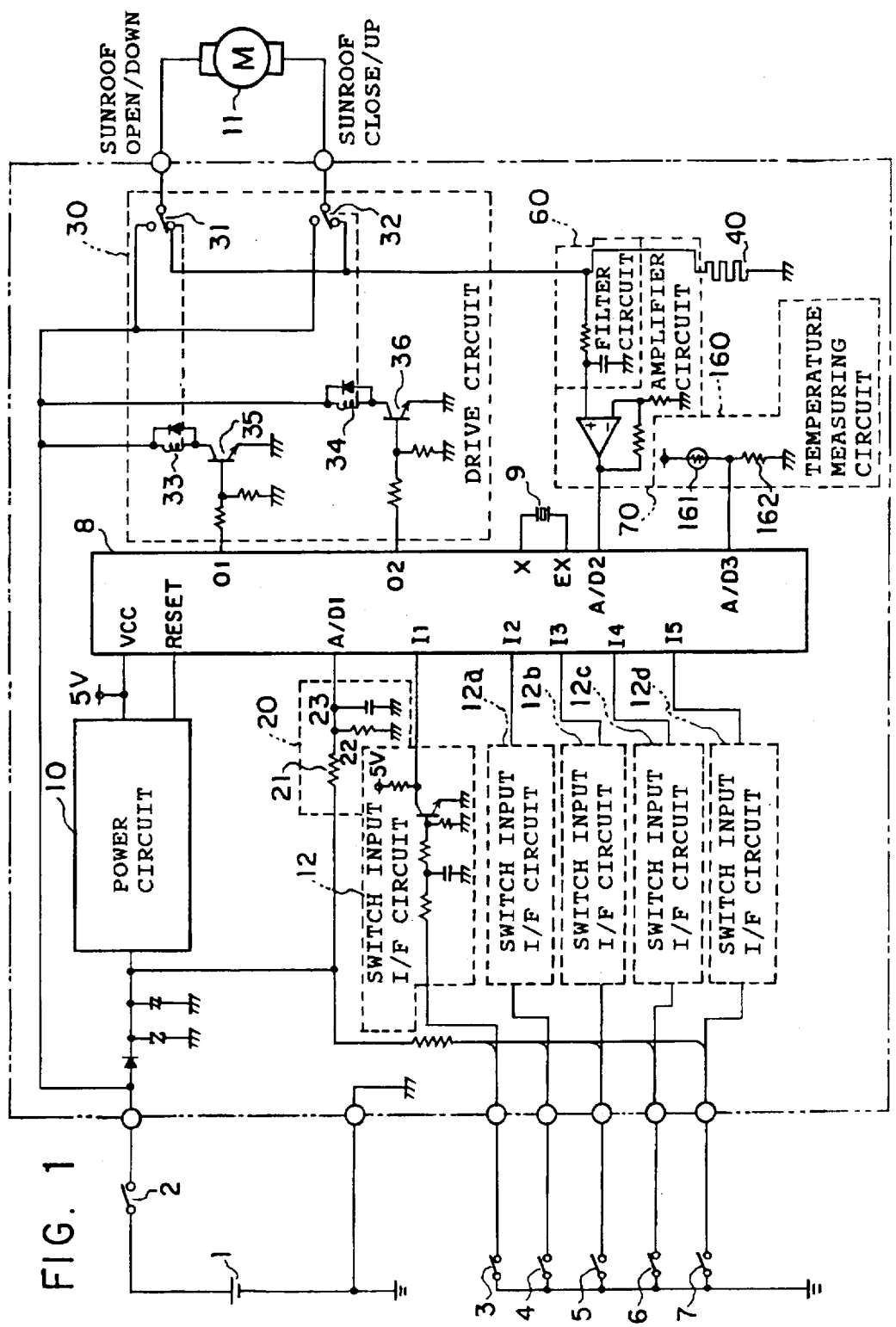
FIG. 1 is a circuit diagram showing a control apparatus of a motor-driven opening/closing member of a vehicle according to a first embodiment of the invention.

An embodiment of the invention will be described below with reference to the accompanying drawings. FIG. 1 is a circuit diagram showing a sunroof opening/closing control apparatus according to a first embodiment of the invention. Referring to FIG. 1, reference numeral 11 denotes a motor. Reference numeral 30 denotes a drive circuit for the motor including relay contacts 31 and 32 for switching driving current supply circuits for the motor 11 and relay coils 33 and 34 for driving the relay contacts. Reference numeral 40 denotes a series resistor connected to the motor 11 for detecting the driving current for the motor 11, 60 denotes a filter circuit for eliminating the high-frequency component of the voltage generated between both ends of the series resistor 40, and 70 denotes an amplifier for amplifying the output signal of the filter circuit 60.

Reference numeral 1 denotes a battery mounted on the vehicle, 2 denotes an ignition switch connected to the battery 1, 3 denotes an opening switch for outputting a starting signal for opening the sunroof panel according to an operation of the user, 4 denotes a closing switch for outputting a starting signal for closing the sunroof panel according to an operation of the user, 5 denotes a full-closed position switch to be turned on when the sunroof panel is brought into its full-closed state, 6 denotes a full-open position switch to be turned on when the sunroof panel is brought into its full-open state, and 7 denotes a highest tilted position switch to be turned on when the sunroof panel is brought to its highest tilted position. Reference numeral 8 denotes a control processor circuit, being for example a microcomputer, for controlling sliding operations of the sunroof panel according to the states of the switches 3–7. Reference numeral 9 denotes an oscillator supplying the microcomputer 8 with a clock pulse, and 10 denotes a power circuit for supplying the microcomputer 8 with power. Although cases where the microcomputer 8 is used for the control processor circuit will be described below, such a control processor circuit may also be realized by other elements than the microcomputer.

Reference numerals 12 and 12a–12d denote interface circuits for inputting output signals of the opening switch 3, closing switch 4, full-closed position switch 5, full-open position switch 6, and the highest tilted position switch 7 to their respective input ports I1–I5 of the microcomputer 8. Reference numeral 20 denotes an interface circuit for inputting the voltage applied to the motor 11 to a #1 A–D (A/D1) port of the control processor circuit 8 and it includes resistors 21 and 22 for dividing the voltage applied to the motor 11 and a noise absorbing capacitor 23.

The drive circuit 30 includes drive transistors 35 and 36 turning on/off the current supplied to the relay coil 33 and 34 responding to the signal output from a #1 output (O1) port and a #2 output (O2) port, respectively, of the microcomputer 8. The output signal of the amplifier 70 is input to a #2 A–D (A/D2) port of the microcomputer 8. Reference numeral 160 denotes a temperature measuring circuit made up of a thermistor 161 and a resistor 162 and its output signal is input to a #3 A–D (A/D3) port of the microcomputer 8. The #1 A–D port, the #2 A–D port, and the #3 A–D port are analog-to-digital conversion ports of the microcomputer 8.

Figure 2:
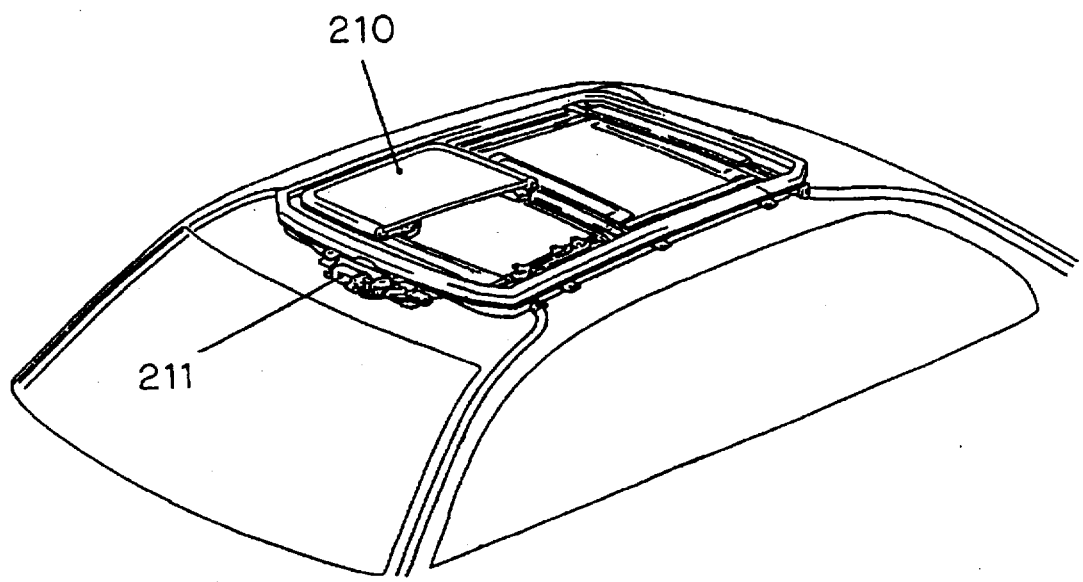
FIG. 2 is a perspective view, with portions broken away, of a sunroof.
Figure 3A:
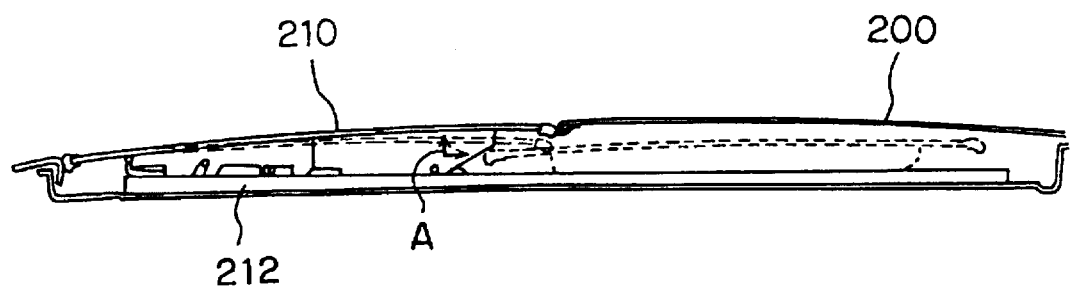
FIG. 3(a) and FIG. 3(b) are sectional views each showing a section of the sunroof.
Figure 3B:
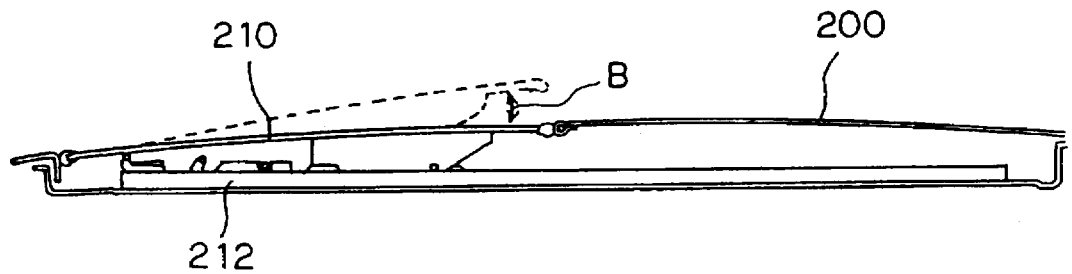

FIG. 2 is a perspective view showing a sunroof with a portion of the actuator cut off, FIG. 3(a) and FIG. 3(b) are sectional views of the sunroof explanatory of opening/closing operations and tilting up/down operations of the sunroof panel. The actuator 211 shown in FIG. 2 shifts the sunroof panel 210 along the guide rail 212 as shown by the arrow head A in FIG. 3(a) to thereby open the sunroof (as indicated by the broken line) and close the same (as indicated by the full line). Further, the actuator moves the rear portion of the sunroof panel in its full-closed position upward and downward as shown by the arrow heads B in FIG. 3(b) to thereby make tilting up/down operation. Reference numeral 200 in FIG. 3(a) and FIG. 3(b) denotes the roof panel. The tilting up/down operation means the operation to tilt upward/downward the rear portion of the sunroof panel 210.

When the user desires to open the sunroof panel 210 or to tilt it downward, he depresses the opening switch 3. When the user desires to close the sunroof panel 210 or to tilt it upward, he depresses the closing switch 4.

Operations will now be described. When the ignition switch 2 is turned on, the battery 1 is connected to the power circuit 10 and the microcomputer 8 is supplied with voltage from the power circuit 10. When power is turned on, or in the event of a malfunction with the watchdog, a reset signal is generated for initializing the control processor circuit 8. The relay coils 33 and 34 of the drive circuit 30 are supplied with voltage from the battery 1. The voltage of the battery 1 is further divided by the resistors 21 and 22 of the interface circuit 20 and the divided voltage, after being deprived of noises by the capacitor 23, is input to the #1 A–D port of the microcomputer 8.

When the motor 11 is driven to rotate forwardly, i.e., when opening operation or tilting down operation of the sunroof panel is made, the microcomputer 8 brings the #1 output port to a high level and the #2 output port to a low level. Then, the drive transistor 35 of the drive circuit 30 is turned on. Accordingly, current flows through the relay coil 33 and the relay contact 31 is connected to the power supply side. Then, the driving current is allowed to flow from the battery 1 to the motor 11 in the forward direction through the relay contact 31, motor 11, relay contact 32, and the series resistor 40. As a result, the motor 11 makes its forward rotation.

When the motor 11 is driven to rotate reversely, i.e., when closing operation or tilting up operation of the sunroof panel is made, the microcomputer 8 brings the #2 output port to a high level and the #1 output port to a low level. Then, the drive transistor 36 of the drive circuit 30 is turned on. Accordingly, current flows through the relay coil 34 and the relay contact 32 is connected to the power supply side. Then, the driving current is allowed to flow from the battery 1 to the motor 11 in the reverse direction through the relay contact 32, motor 11, relay contact 31, and the series resistor 40. As a result, the motor 11 makes its reverse rotation.

On/off signals from the opening switch 3, closing switch 4, full-closed position switch 5, full-open position switch 6, and the highest tilted position switch 7 are input to corresponding interface circuits 12 and 12a–12d, respectively. Each of the interface circuits 12 and 12a–12d supplies a high level signal, when the switch 3–7 connected thereto is on, or a low level signal, when the switch is off, to the #1 input port I1–#5 input port corresponding thereto. The #1 A–D port of the microcomputer 8 is supplied with a signal obtained by voltage-dividing the voltage applied to the motor 11 by the resistors 21 and 22 of the interface circuit 20. The #2 A–D port is supplied with a signal obtained by amplifying the voltage drop across the series resistor 40, i.e., a signal correlative to the driving current for the motor 11.

Now, basic operation will be described with reference to the flowchart of FIG. 4. In step ST1, which follows the initial start such as turning power on, initial setting of the microcomputer 8 is performed. Namely, the area in which measured values for use in the control, the area in which calculated data, and flags are initialized. In step ST2, the microcomputer 8 determines whether an overload (foreign matter intrusion) has occurred while the motor 11 has been in motion. The determination as to occurrence of an overload is made by using an overload-occurrence flag, which will be described later. When no overload has occurred, step ST3 follows. When an overload has occurred, step ST4 follows and a process coping with overload occurrence is performed therein. In step ST3, the microcomputer 8 detects the input levels from the switches 3–7 and, responding to the input levels, performs a process for driving the motor 11.

In step ST5, the microcomputer 8 determines whether the motor 11 is being driven. When the motor 11 is being driven, it advances to step ST6 for a load detecting process, and when the motor is not being driven, it returns to step ST3.

Figure 5:
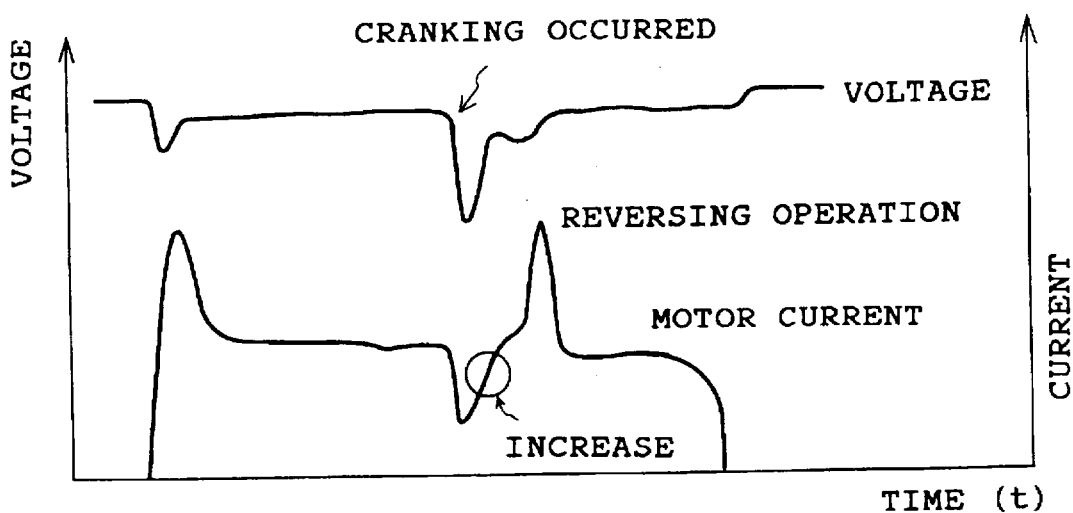
FIG. 5 is a waveform chart showing examples of battery voltage and motor current when cranking has been performed.
Figure 6:
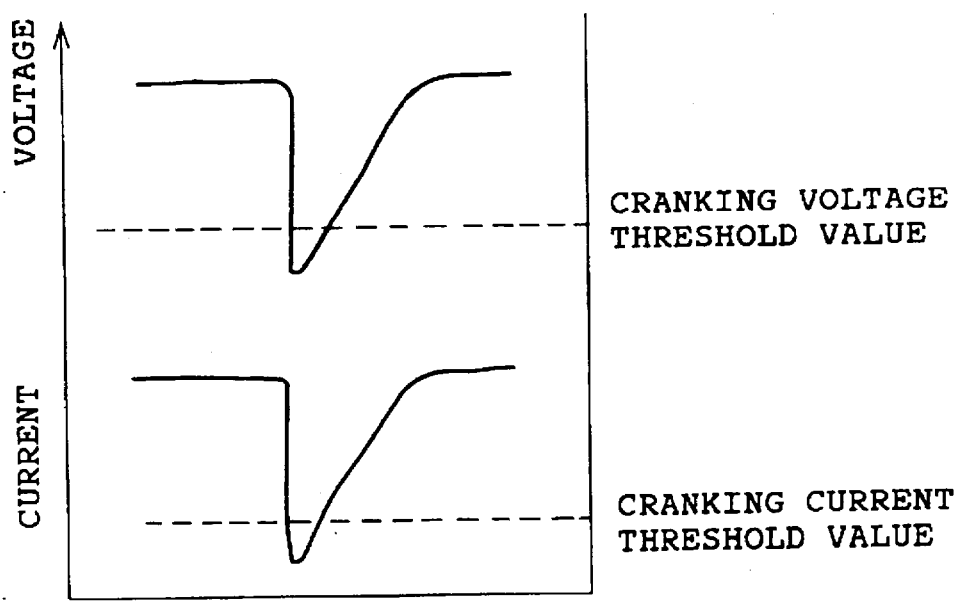
FIG. 6 is an enlarged waveform chart of portions of FIG. 5.

In step ST6 and step ST7, the microcomputer 8 determines whether there has occurred an overload on the motor 11 being in motion. When it is determined that an overload has occurred, the microcomputer 8 performs a process coping with overload occurrence. When it is determined that no overload has occurred, the microcomputer 8 advances to step ST8. Incidentally, it is determined whether an overload has occurred or not according to the overload-occurrence flag in step ST7, the same as in step ST2. In step ST8 and step ST9, the microcomputer 8 determines whether an engine starting operation (cranking) has been made while the motor 11 has been in motion. FIG. 5 is a waveform chart showing examples of waveforms of the voltage of the battery 1 and the current flowing through the motor 11 at the time when cranking was made. FIG. 6 is an enlarged waveform chart of part of FIG. 5.

In step ST8, the microcomputer 8 determines whether the voltage applied to the motor 11 has become lower than a cranking voltage threshold value. The voltage applied to the motor 11 is determined by the input value to the #1 A–D port. When the input value to the #1 A–D port is under the threshold value 8V, for example, it is judged that there is a possibility of cranking being made. When the applied voltage is lower than the cranking voltage threshold value, determination of current is made further (step ST9).

In step ST9, the microcomputer 8 determines whether the current flowing through the motor 11 is lower than a cranking current threshold value. The current flowing through the motor 11 is determined by the input value to the #2 A–D port. When the input value to the #2 A–D port is under the threshold value 2A, for example, it is judged that cranking has been made. When it is judged that cranking has been made, the microcomputer 8 performs a motor stopping process (step ST10) and returns to step ST2.

When it is determined in step ST8 and step ST9 that cranking has not been made, the microcomputer 8 performs a stopping process of the motor 11 according to switch input levels to the switches 3–7 (step ST11). When the motor 11 is being driven, the microcomputer 8 returns to step ST6 and, when the motor 11 is stopped, it returns to step ST2 (step ST12).

The processes in step ST3, step ST4, step ST6, step ST10, and step ST11 will be described below in detail.

Figure 7:
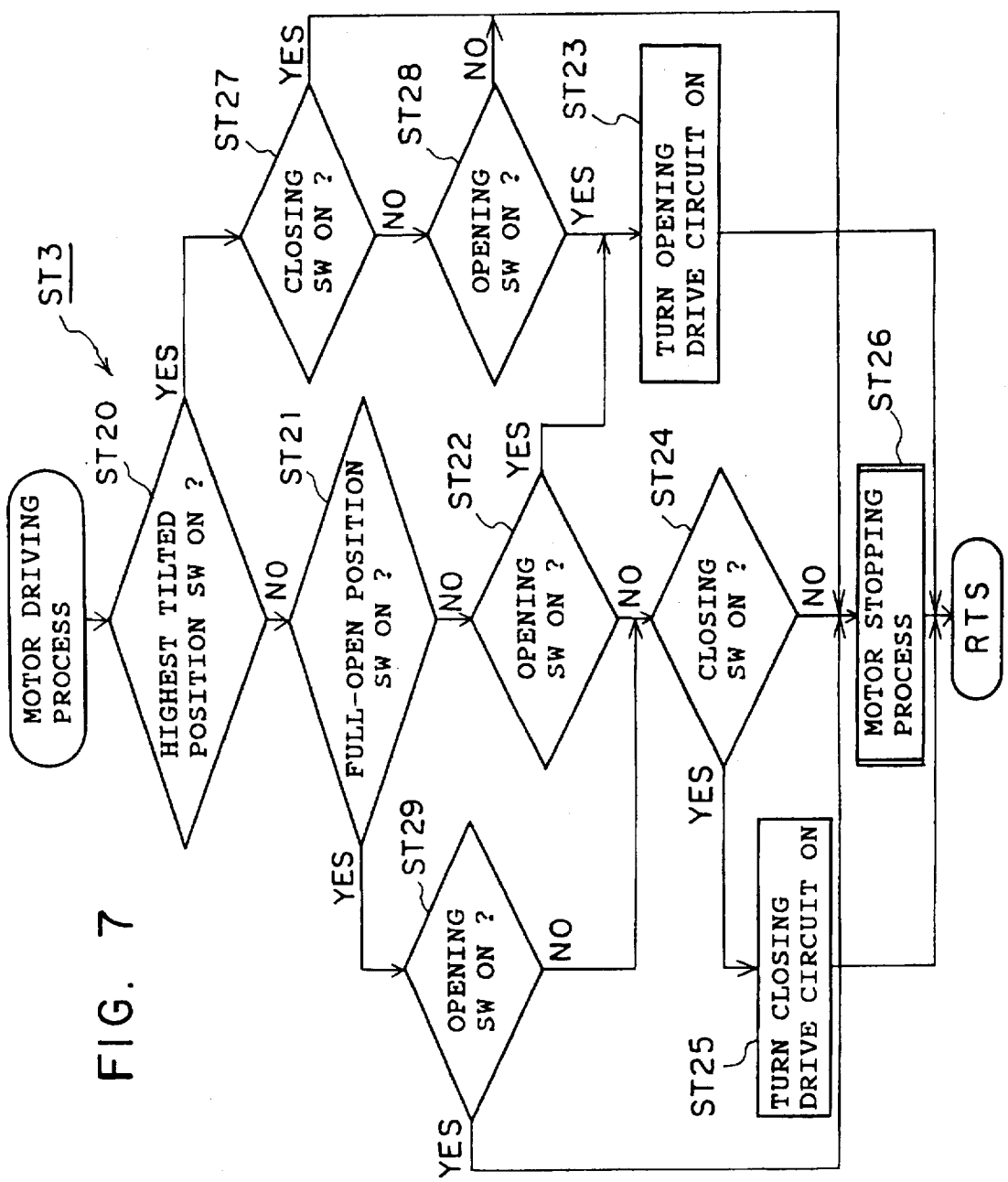
FIG. 7 is a flowchart showing a motor driving process.

The driving process of the motor 11 in step ST3 will be described with reference to the flowchart of FIG. 7. The microcomputer 8 detects the position of the sunroof panel. States of the highest tilted position switch 7 and the full-open position switch 6 are checked in step ST20 and step ST21. If both the switches are off, the sunroof panel is in a position in the middle of its sliding stroke, or in a position between the highest tilted position and the full-closed position. In such case, the microcomputer 8 advances to step ST22.

In step ST22, the microcomputer 8 detects the state of the opening switch 3. If the opening switch 3 is on, it moves to step ST23 to open the sunroof or to lower the sunroof. In step ST23, the microcomputer 8 turns on the drive transistor 35 of the drive circuit 30 through the #1 output port. Then, the motor 11 rotates in the forward direction. Accordingly, when the sunroof panel is in a position in the middle of its sliding stroke, it slides to the opening side. When the sunroof panel is in a position between the highest tilted position and the full-closed position, it moves downward.

When the opening switch 3 is detected in its off state in step ST22, step ST24 follows. In step ST24, the microcomputer 8 detects the state of the closing switch 4. When the closing switch 4 is on, it moves to step ST25 to close the sunroof or to raise the sunroof panel. In step ST25, the microcomputer 8 turns on the drive transistor 36 of the drive circuit 30 through the #2 output port. Then, the motor 11 rotates in the reverse direction. Hence, when the sunroof panel is in a position in the middle of its sliding stroke, it slides to the closing side. When the sunroof panel is in a position between the highest tilted position and the full-closed position, it moves upward.

When the closing switch 4 is off in step ST24, the microcomputer 8 maintains the drive transistors 35 and 36 of the drive circuit 30 as they are in their off states (step ST26).

When the highest tilted position switch 7 is detected in its on state in step ST20, the sunroof panel is in the In step ST27, the microcomputer 8 detects the state of the closing switch 4. In this case, the sunroof panel cannot be moved in its ascending direction. Hence, when the closing switch 4 is on, the microcomputer 8 moves to step ST26 and maintains the transistors 35 and 36 of the drive circuit 30 as they are in their off states. As described above, the user depresses the closing switch 4 also when he desires to tilt up the sunroof panel.

On the other hand, when the closing switch 4 is off, step ST28 follows. In step ST28, the microcomputer 8 detects the state of the opening switch 3. When the opening switch 3 is on, it performs the process to lower the sunroof panel (step ST23). As described above, the user depresses the opening switch 3 also when he desires to tilt down the sunroof panel, and the rotating direction of the motor when the sunroof panel is slid to the opening side and the rotating direction of the motor when the sunroof panel is moved downward are the same. If the opening switch 3 is also off in step ST28, the microcomputer 8 moves to step ST26 and maintains the drive transistors 35 and 36 of the drive circuit 30 as they are in their off states.

When the full-open position switch 6 is detected in its on state in step ST21, the sunroof panel is in its full-open state. In this case, the microcomputer 8 detects the states of the opening switch 3 and the closing switch 4. First, in step ST29, it detects the state of the opening switch 3. In this case, the sunroof panel cannot be slid to the opening direction. Therefore, when the opening switch 3 is on, the microcomputer 8 maintains the drive transistors 35 and 36 of the drive circuit 30 as they are in their off states (step ST26). If the opening switch 3 is off, the microcomputer 8 detects the state of the closing switch 4 (step ST24). When the closing switch 4 is on, the microcomputer 8 starts an operation to reverse the motor 11 to close the sunroof (step ST25). If the closing switch 4 is off, it maintains the drive transistors 35 and 36 as they are in their off states (step ST26).

The process to stop the motor 11 in step ST11 will be described with reference to the flowchart of FIG. 8. First, in step ST30, the microcomputer 8 detects the state of the opening side of the drive circuit, i.e., the state of the drive transistor 35 of the drive circuit 30. The state of the drive transistor 35 can be detected for example by reading the content output from the #1 output port. When the result of the detection is off, step ST31 follows. In step ST31, the microcomputer 8 detects the state of the closing side of the drive circuit, i.e., the state of the drive transistor 36 of the drive circuit 30. The state of the drive transistor 36 can be detected for example by reading the content output from the #2 output port. If the result of this detection is also off, the microcomputer 8 maintains the drive circuit 30 in its off state (step ST32).

When the opening side of the drive circuit is detected in its on state in step ST30, i.e., when the sunroof panel sliding to the opening side or the sunroof panel moving downward is detected, the microcomputer 8 detects the state of the full-open position switch 6 (step ST33). If the full-open position switch 6 is on, it means that the sunroof panel, after sliding to the opening side, has reached the full-open position. Then, the microcomputer 8 turns off the drive circuit 30. Namely, it turns off the drive transistors 35 and 36. When the full-open position switch 6 is off, the microcomputer 8 detects the state of the full-closed position switch 5 in step ST34. If the full-closed position switch 5 is on, it means that the sunroof panel, after descending from a tilted up position, has reached the full-closed position. Therefore, the microcomputer 8 turns off the drive circuit 30 (step ST32).

On the other hand, if the full-closed position switch 5 is off in step ST34, step ST35 follows. In step ST35, the microcomputer 8 detects the state of the closing switch 4. If the closing switch 4 is off, i.e., if the user does not want to close or raise the sunroof, the microcomputer 8 maintains the opening side of the drive circuit in its on state (step ST36). Accordingly, the sunroof panel continues to slide toward the opening side or to move downward. If the closing switch 4 is on, the microcomputer 8 here turns off the drive circuit 30 and stops the sliding motion of the sunroof panel. Namely, by operation of the switch by the user causing the motor 11 to rotate in the direction reverse to its present rotating direction, the motor 11 is stopped.

If, in step ST31, the closing side of the drive circuit is detected in its on state, it means that the sunroof panel is sliding to the closing side or moving upward. In such case, the microcomputer 8 detects the state of the highest tilted position switch 7 (step ST37). If the highest tilted position switch 7 is on, it means that the sunroof panel, after moving upward, has reached the highest tilted position. Accordingly, the microcomputer 8 turns off the drive circuit 30 (step ST32). On the other hand, if the highest tilted position switch 7 is off, the microcomputer 8 detects the state of the full-closed position switch 5 (step ST38). When the full-closed position switch 5 is on, it means that the sunroof panel, after sliding to the closing side, has reached the full-closed position. In this case, the microcomputer 8 turns off the drive circuit 30 (step ST32). If the full-closed position switch 5 is also off, step ST39 follows.

In step ST39, the microcomputer 8 detects the state of the opening switch 3. When the opening switch 3 is off, i.e., when the user does not want to open or lower the sunroof, the microcomputer 8 maintains the closing side of the drive circuit in its on state (step ST40). Hence, the sunroof panel continues to slide to the closing side or to move upward. If the opening switch 3 is on, the microcomputer 8 turns off the drive circuit 30 (step ST32).

Now, the detection of load in step ST6 will be described. Detection of an overload is performed through monitoring the driving current for the motor 11. The driving current for the motor 11 increases with increase in the load. Therefore, an increase in the driving current corresponding to a predetermined amount of overload is previously set up as a threshold value. Then, increase in the driving current is detected at intervals of a predetermined period of time and it is judged that an overload (intrusion of foreign matter or a bite in the sliding portion) has occurred when the detected increase in the driving current has exceeded the threshold value.

Figure 9:
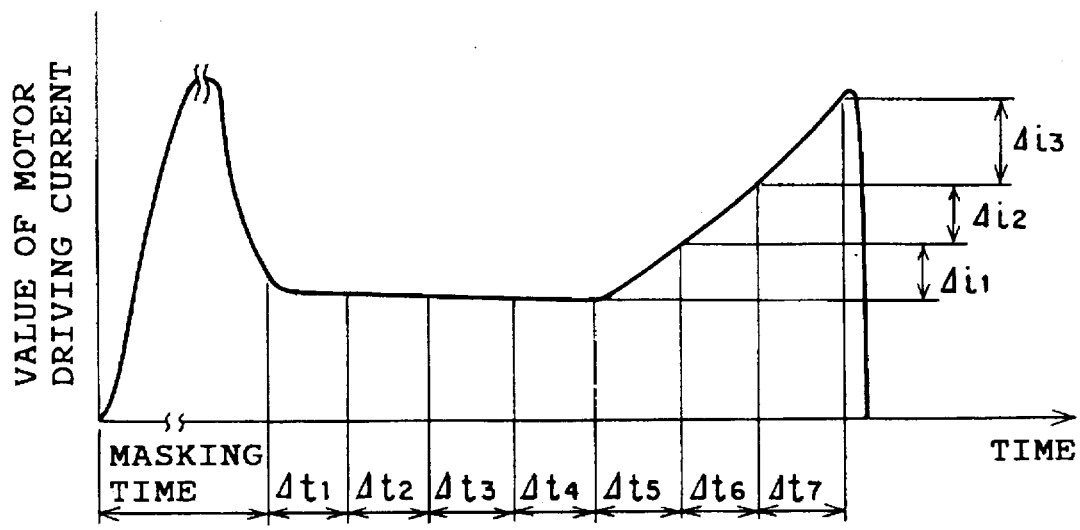
FIG. 9(a) is a diagram of an example of the change in a motor driving current from the start to the end of the drive of the motor.
FIG. 9(b) is a diagram showing relationship between increases in the driving current detected at predetermined intervals and a threshold value.
Figure 9:
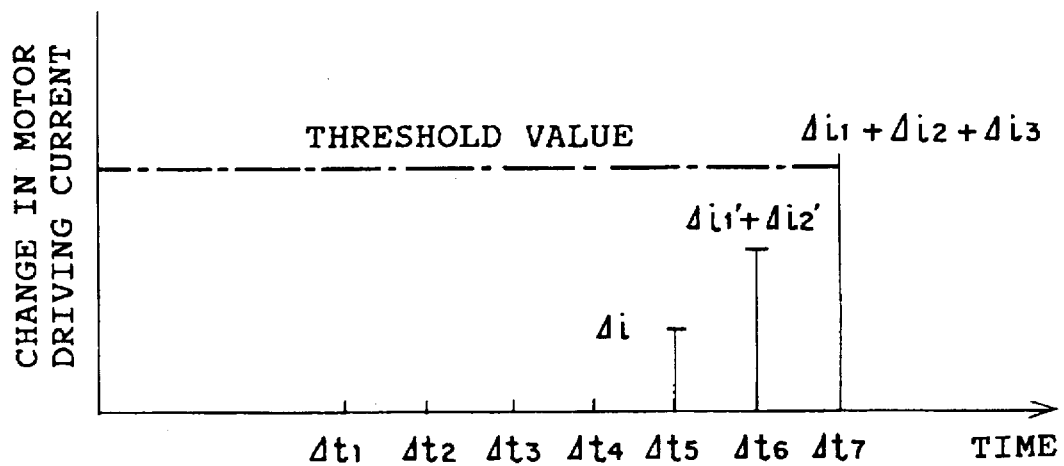

FIG. 9(a) and FIG. 9(b) are diagrams showing the outline of the load detecting operation. FIG. 9(a) shows an example of the change of the driving current during the period between the start of driving of the motor 11 and the end of it. FIG. 9(b) shows relationship between the increase in the driving current detected at intervals of a predetermined period of time and the threshold value.

Since a transient current flows through the motor 11 for some time (about 200 ms) after the start of the driving of the motor 11, the load detection is masked. After the masking time has elapsed, the change in the driving current for the motor 11 is detected at intervals of $\Delta t$ (for example, 20 ms). In FIG. 9(a), it is shown that the sliding load of the sunroof panel is kept smooth during the interval $\Delta t1$–$\Delta t4$ and there is practically no change of the driving current. However, it is shown that an overload occurred at the time interval $\Delta t5$ and increases in the driving current $\Delta i1$, $\Delta i2$, and $\Delta i3$ were produced during the intervals $\Delta t5$, $\Delta t6$, and $\Delta t7$, respectively. As shown in FIG. 9(b), the total sum of the increases in the driving current $\Delta i1$, $\Delta i2$, and $\Delta i3$ exceeds the threshold value after the time interval $\Delta t7$. In such case, an overload is detected.

Figure 10A:
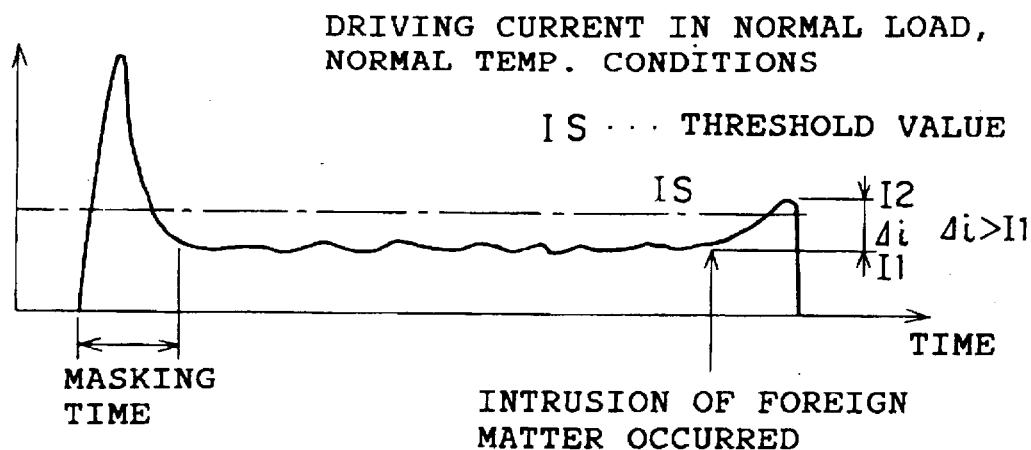
FIG. 10(a) is a waveform chart showing an example of the waveform of the driving current for a motor under normal temperature and normal load conditions.
Figure 10B:
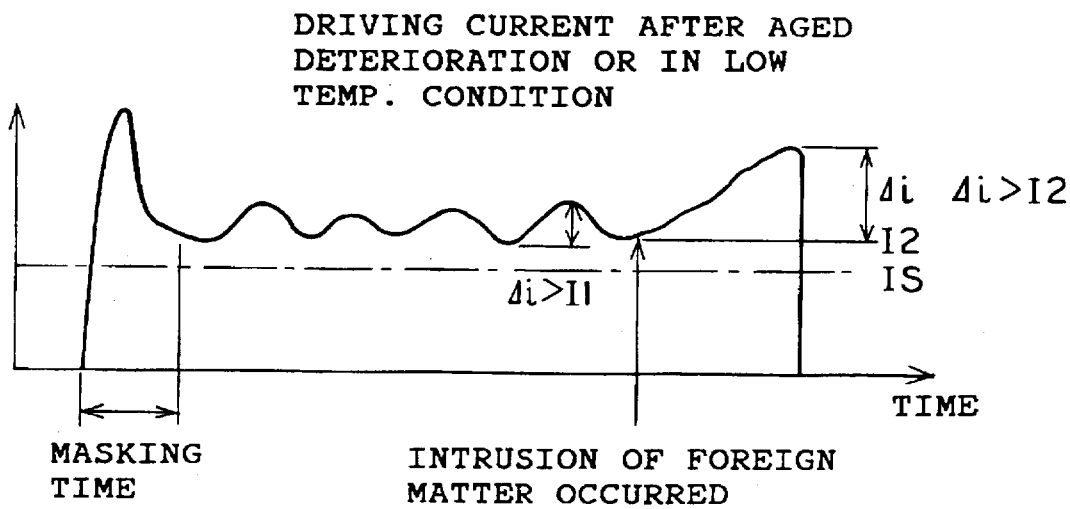
FIG. 10(b) is a waveform chart showing an example of the waveform of the driving current for a motor in a low temperature state or in its state suffering from aged deterioration due to a dusty environment.

The method of overload detection will be described below in detail. FIG. 10(a) is a waveform chart showing an example of the waveform of the driving current for the motor 11 under a normal load and a normal temperature condition. FIG. 10(b) is a waveform chart showing an example of the waveform of the driving current for the motor 11 in a low temperature condition or in its state suffering from aged deterioration due to a dusty environment. In FIG. 10(a) and FIG. 10(b), it is shown that the overload threshold value is set to I1 (for example 1.5A) under the normal temperature and normal load conditions and the overload threshold value is set to I2 (for example 2A) in the low temperature condition or in the state of the motor 11 suffering from aged deterioration due to a dusty environment. Hence, even if a change in the current flow exceeding the threshold value I1 is produced on account of irregularities of the sliding resistance, the sunroof panel is prevented from being stopped or reversely moved by wrong overload detection.

Figure 11A:
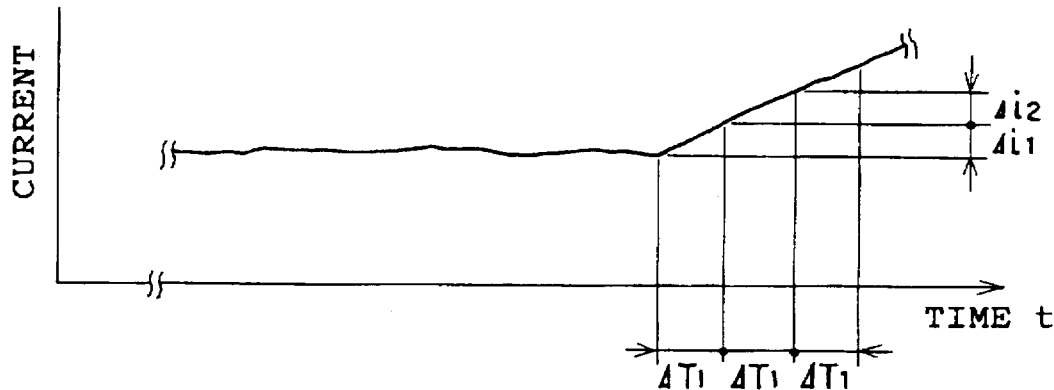
FIG. 11(a) is a diagram showing sampling intervals of the driving current for a motor under normal temperature, normal load, and normal voltage conditions.
Figure 11B:
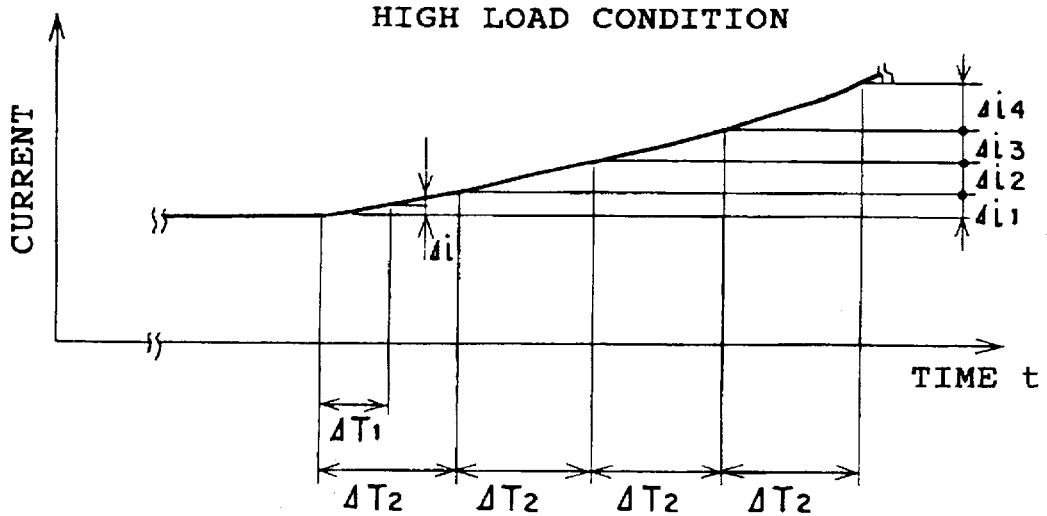
FIG. 11(b) is a diagram showing sampling intervals of the driving current for a motor under a low temperature, a low voltage, or a high load condition.

FIG. 11(a) shows sampling intervals of the driving current for the motor 11 under normal temperature, normal load, and normal voltage conditions and FIG. 11(b) shows sampling intervals of the driving current for the motor 11 under a low temperature, a low voltage, or a high load condition. The sampling interval $\Delta T2$ shown in FIG. 11(b) is two times as large as the sampling interval $\Delta T1$ shown in FIG. 11(a). Thus, under a low temperature, a low voltage, or a high load condition, the change in the driving current during one sampling interval becomes larger and, therefore, correct detection of the change is ensured.

Figure 12:
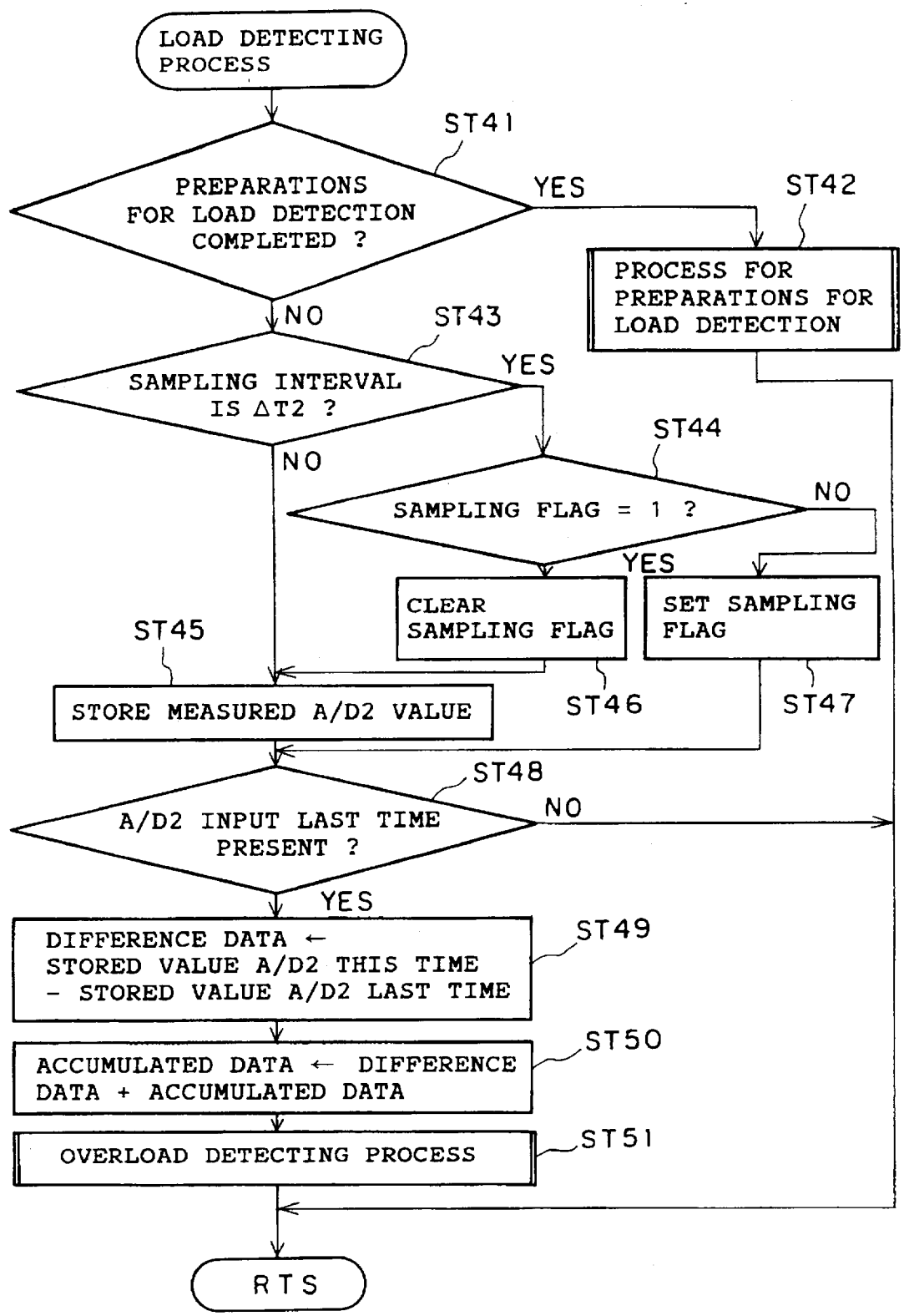
FIG. 12 is a flowchart showing a load detecting process.

The process of load detection control in step ST6 in concrete terms will be described with reference to the flowchart of FIG. 12. First, in step ST41, the microcomputer 8 determines whether preparations for the overload detection are completed. If the preparations for overload detection are not yet completed, a process for preparing for overload detection is performed (step ST42). The process for preparing for overload detection includes the steps of selecting the threshold values I1 and I2 for overload detection and the steps of setting up the sampling intervals $\Delta T1$ and $\Delta T2$.

Figure 13:
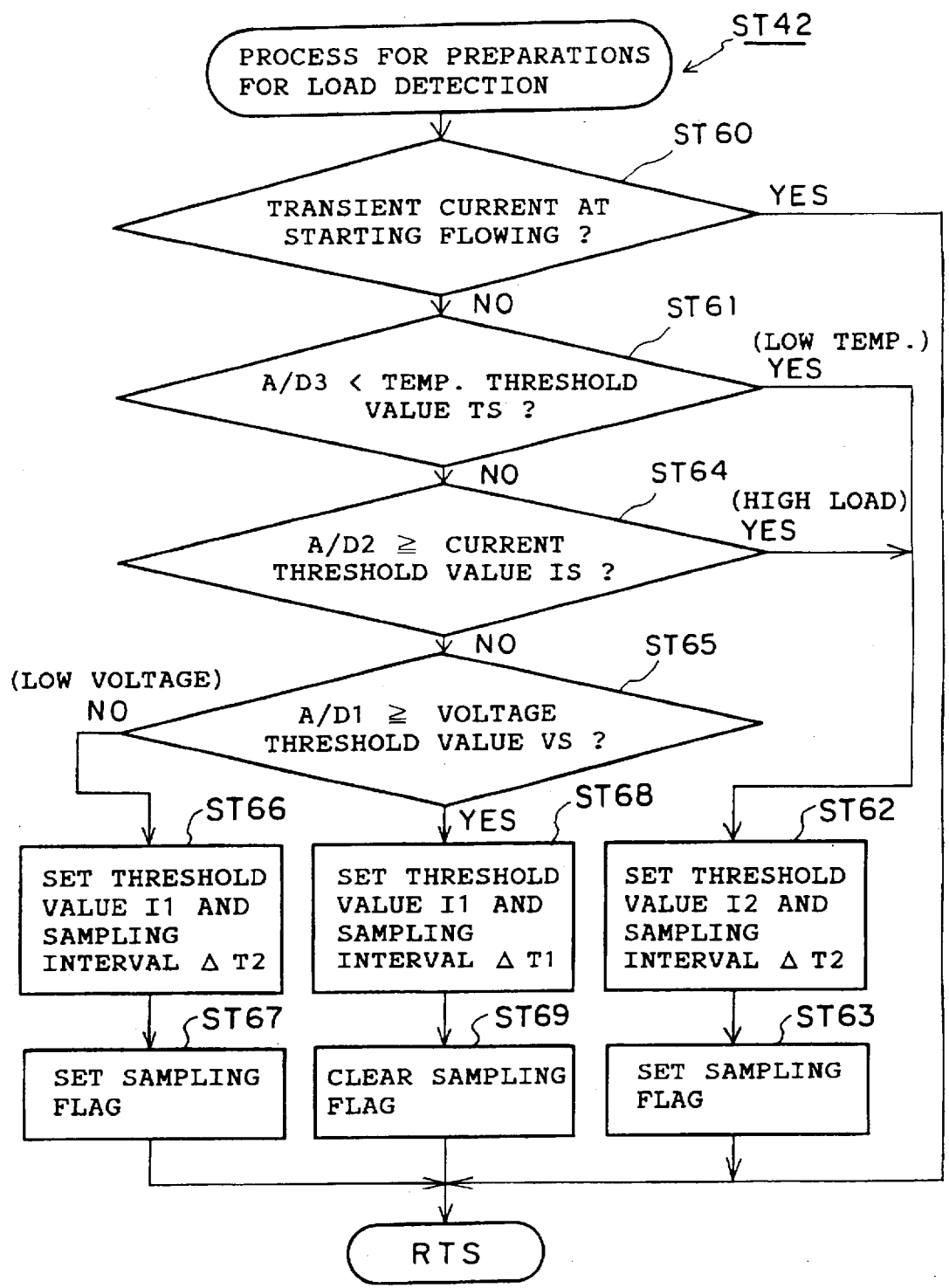
FIG. 13 is a flowchart showing a process for preparations for load detection.

As to the process for preparations for load detection, description will be made with reference to the flowchart of FIG. 13. First, in step ST60, the microcomputer 8 determines whether the current flowing through the motor 11 is a transient current. A transient current is for example shown on the left-hand side of FIG. 10(a). The microcomputer 8, here, does not make any operation while the transient current is flowing. Since the microcomputer 8 performs no operation in step ST42, the overload detection in step ST51 of FIG. 12 is not performed while the transient current is flowing (about a period of 200 ms). Namely, the overload detecting process is in a masked state. In concrete terms, the microcomputer 8 starts the timer at the point of initial start, such as the turning on of power, and takes the period up to counting out of 200 ms as the period during which the transient current flows.

When the timer has counted out the period, step ST61 follows. In step ST61, the microcomputer 8 compares the input value to the #3 A-D port (temperature) with a previously stored temperature threshold value TS (for example 0° C.). When the input temperature is lower than the threshold value TS, it judges that the environment is in a low temperature state and moves to step ST62. This state corresponds to the state shown in FIG. 10(b). In step ST62, the microcomputer 8 sets up a value I2 as the overload threshold value and a value ΔT2 as the sampling interval, and advances to step ST63. In step ST63, the microcomputer 8 sets a sampling flag. The sampling flag is that used in the processing in step ST44, step ST46, and step ST47.

When, in step ST61, the input temperature is not lower than the temperature threshold value TS, step ST64 follows. In step ST64, the microcomputer 8 compares the input value to the #2 A-D port (driving current) with a previously stored current threshold value IS shown in FIG. 10(a) (for example 7A). When the driving current value is not smaller than the threshold value IS, the microcomputer 8 takes the state as a high load state and moves to step ST62. This state corresponds to the state shown in FIG. 10(b). When the input driving current is smaller than the threshold value IS, step ST65 follows.

In step ST65, the microcomputer 8 compares the input value to the #1 A-D port (voltage) with a previously stored voltage threshold value VS (for example 10V). When the input voltage value is smaller than the threshold value VS, the microcomputer 8 judges that the battery at the moment is in its low voltage state and moves to step ST66. This state corresponds to the state shown in FIG. 11(b). In step ST66, the microcomputer 8 sets up ΔT2 as the sampling interval and sets up I1 as the overload threshold value, because the state at the moment is neither a low temperature state nor a high load state. In step ST67, the microcomputer 8 sets the sampling flag.

In step ST65, if the input voltage value is not smaller than the threshold value VS, step ST68 follows. The state at this time corresponds to the state shown in FIG. 10(a). In step ST68, the microcomputer 8 sets up ΔT1 as the sampling interval and sets up I1 as the overload threshold value. Then, the microcomputer 8 clears the sampling flag (step ST69). Here, the sampling flag in its on state indicates that the sampling interval is set to ΔT2 and the sampling flag in its off state indicates that the sampling interval is set to ΔT1. Through the process for preparations of load detection performed as described above, the overload threshold value I1 and the sampling interval ΔT1 or ΔT2 of the driving current data are decided.

If, in step ST41, the process for preparations for overload detection is completed, step ST43 follows. In step ST43, the microcomputer 8 determines whether the sampling period decided in step ST42 is ΔT2 or not. If the sampling interval is ΔT2, step ST44 follows, and if it is not ΔT2, step ST45 follows. In step ST45, the microcomputer 8 accepts the value at the #2 A-D port (driving current value) and places it into storage.

In step ST44, the microcomputer 8 checks the value of the sampling flag. When the sampling flag is in its set state, the microcomputer 8 clears the sampling flag (step ST46) and moves to step ST45. If the sampling flag is in its cleared state, the microcomputer 8 sets the sampling flag (step ST47) and skips over the process in step ST45. Therefore, when the sampling interval is set to ΔT2, the driving current for the motor 11 is input every other routine of the load detecting process. When it is not set to ΔT2, the driving current is input every routine of the load detecting process. Namely, the time interval at which the driving current is input is ΔT1.

In step ST48, the microcomputer 8 determines whether the value at the #2 A-D port input at the last time is present. When the value at the #2 A-D port input at the last time is not present, the microcomputer 8 performs nothing. When the value input at the last time is present, it advances to step ST49. In step ST49, the microcomputer 8 stores the difference between the value at the #2 A-D port input this time and the value at the #2 A-D port input the last time as difference data. Further, in step ST50, it adds the difference data to accumulated data and stores the total sum as new accumulated data. Namely, the accumulated data is updated every time the load detecting process is executed.

In step ST51, the microcomputer 8 compares the updated accumulated data with the overload threshold value I1 or I2 to thereby perform the process to judge whether an overload has occurred.

Figure 14:
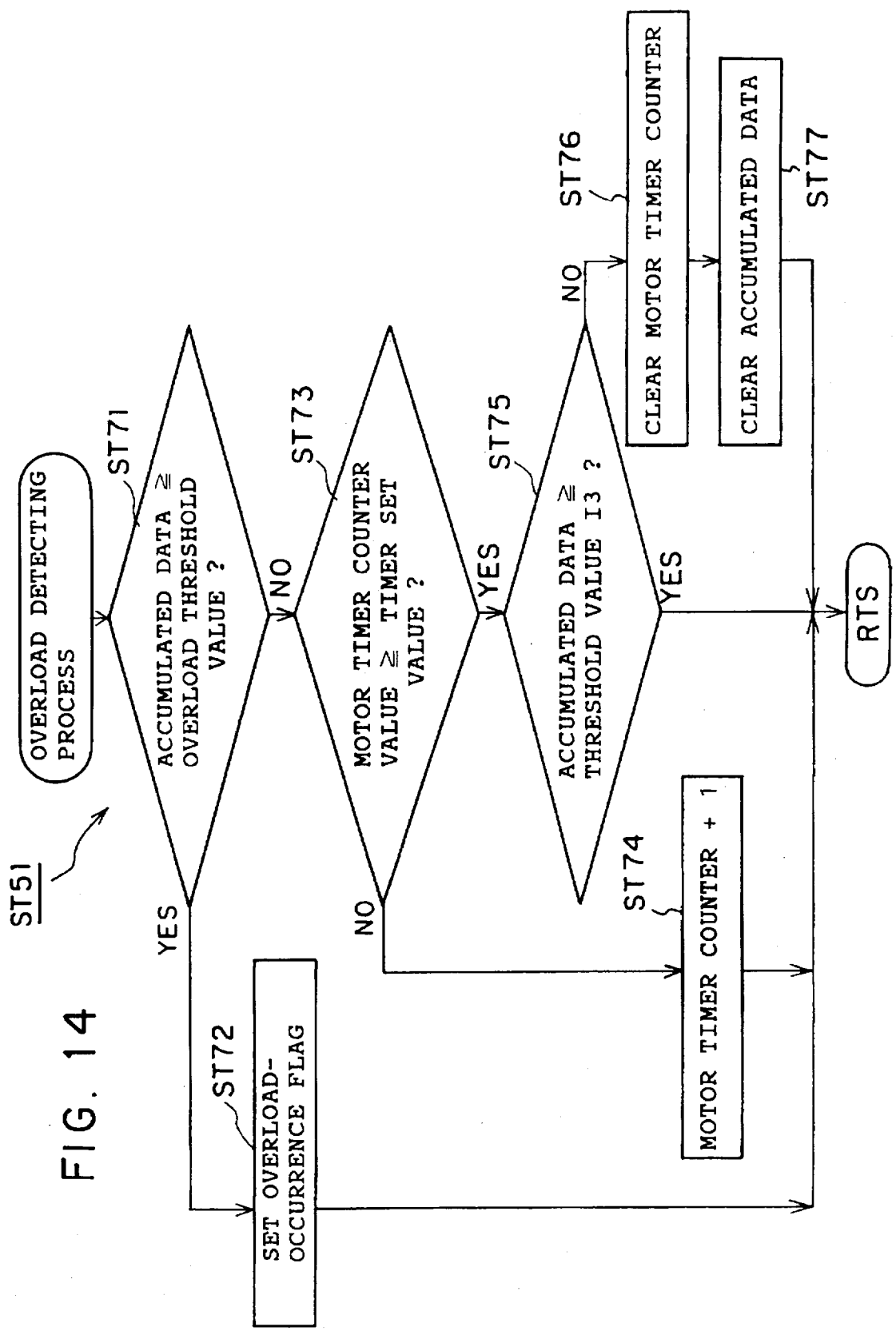
FIG. 14 is a flowchart showing an overload detecting process.

Now, the overload detecting process in step ST51 will be described in detail with reference to the flowchart of FIG. 14. First, in step ST71, the microcomputer 8 compares the accumulated data calculated in step ST50 with the threshold value I1 or I2 decided in the process for preparations for load detection. When the accumulated data is not smaller than the threshold value I1 or I2, step ST72 follows. In step ST72, the microcomputer 8 judges, from the fact that the accumulated data, i.e., the increase in the driving current for the motor 11, has become equal to or exceeded the overload threshold value I1 or I2, that an overload state is brought about and sets an overload-occurrence flag.

The determination in step ST2 and step ST7 as to whether an overload has occurred or not is made according to the overload-occurrence flag.

Figure 15:
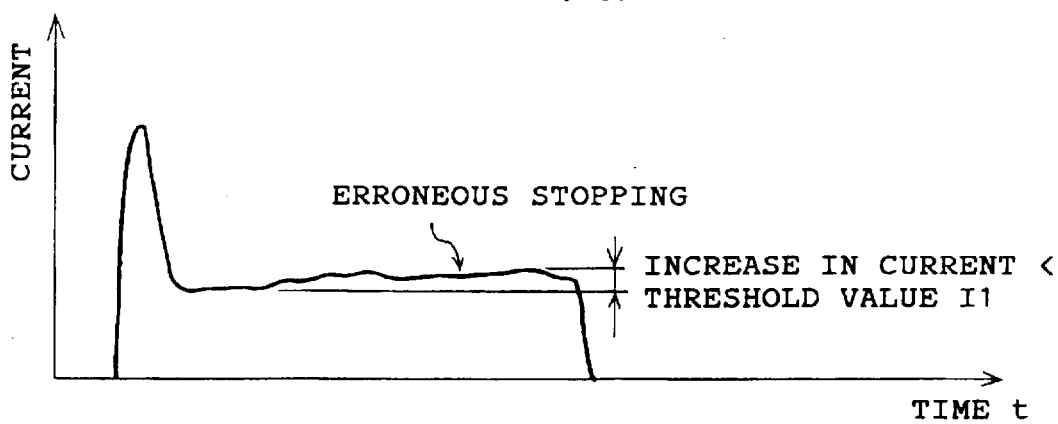
Figure 15:
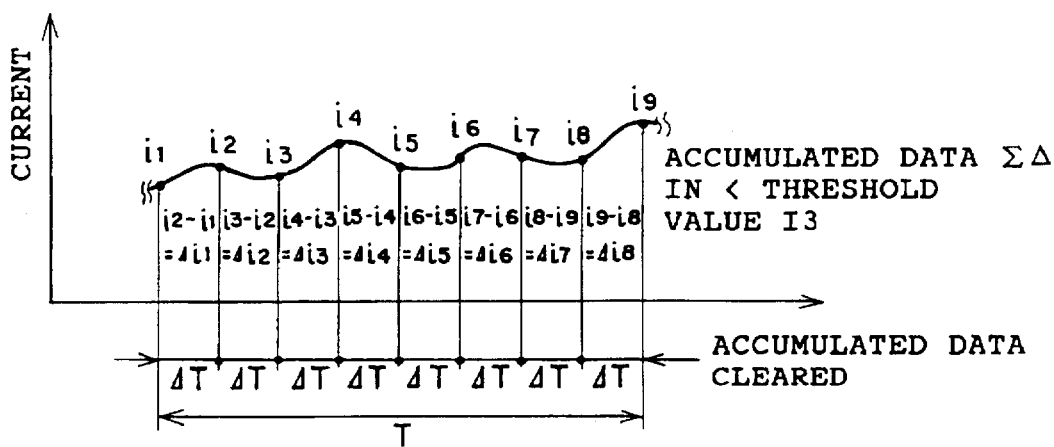
Figure 15:
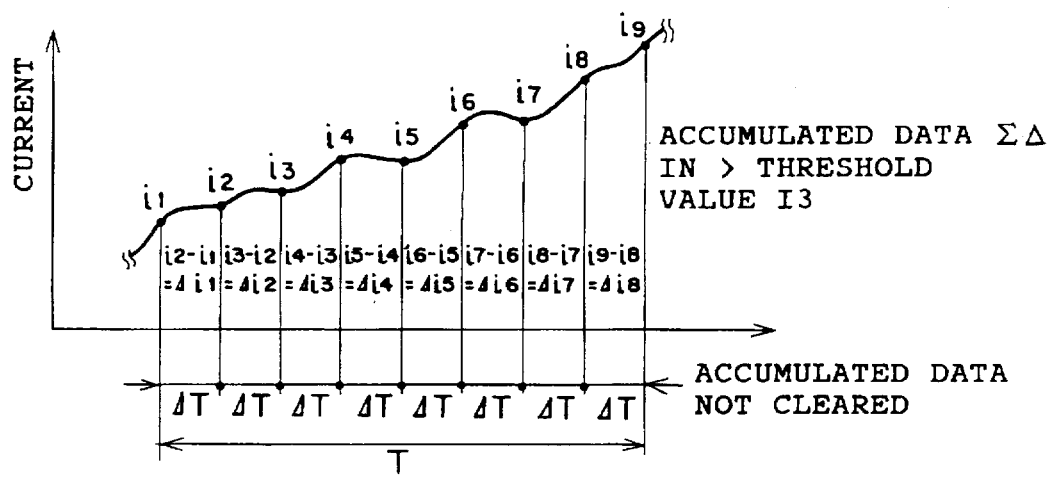

If, in step ST71, the accumulated data is smaller than the threshold value I1 or I2, step ST73 follows. In step ST73, the microcomputer 8 checks the motor timer counter value. The motor timer counter is that for detecting the change in the driving current for the motor 11 during a predetermined period of time in the course of the load detecting process. Operation of the timer counter and the purpose of the provision of the timer counter will be described with reference to FIG. 15(a)-FIG. 15(c). FIG. 15(a) shows a waveform of a current in the case where the motor 11 is stopped in the process of overload detection, although the change in the driving current for the motor 11 is smaller than the overload threshold value. As shown in FIG. 15(b), the driving current for the motor 11 becomes a pulsating current on account of irregularities of the sliding resistance of the sunroof panel. When the pulsating current is detected at intervals of the sampling interval ΔT1 or ΔT2, the accumulated data gradually increases, and it sometimes occurs that the accumulated data becomes equal to or larger than the overload threshold value and a wrong operation is made.

As means to prevent occurrence of such wrong operation, there is a method in which, when, as shown in FIG. 15(b), accumulated data does not reach a predetermined current threshold value I3 (for example 1A) during a predetermined period of time T (for example 80 ms) in the course of the load detecting process, the operation is regarded as a normal operation and the accumulated data is cleared. However, when the accumulated data becomes larger than the threshold value I3 during the predetermined period of time T, as shown in FIG. 15(c), the accumulated data is maintained for use in the overload detection because it is possible that an overload occurs in the near future.

To exercise such control, the predetermined time T is detected by a motor timer counter included in the microcomputer 8. Incidentally, wrong operations are liable to occur under a low temperature condition in which the sliding resistance of the sunroof panel becomes larger, when the sunroof panel has undergone aged deterioration due to dusts in the environment, or when the torque of the motor 11 is lowered due to a drop of the power voltage.

On the ground of what has been described above, processes to be performed in step ST73 and following steps in the flowchart of FIG. 14 will be described. In step ST73, if the motor timer counter value is smaller than the predetermined period of time T, step ST74 follows. In step ST74, the microcomputer 8 provides an increment of one to the motor timer counter. In step ST73, if the motor timer count value is larger than or equal to the predetermined period of time T, step ST75 follows. In step ST75, the microcomputer 8 compares the accumulated data value with the threshold value I3. When the accumulated data is smaller than the threshold value I3, the microcomputer 8 clears the motor timer counter (step ST76) and clears the accumulated data (step ST77). If, in step ST75, the accumulated data is not smaller than the threshold value I3, the values of the motor timer counter and the accumulated data are maintained.

By the above described processing, the accumulated data is reset when the period of time during which the accumulated data is smaller than the threshold value I3 elapses the predetermined time T. Through such processing, occurrence of erroneous operation such as to stop or reverse the sunroof panel on an occasion other than occurrence of an overload can be prevented.

Figure 16:
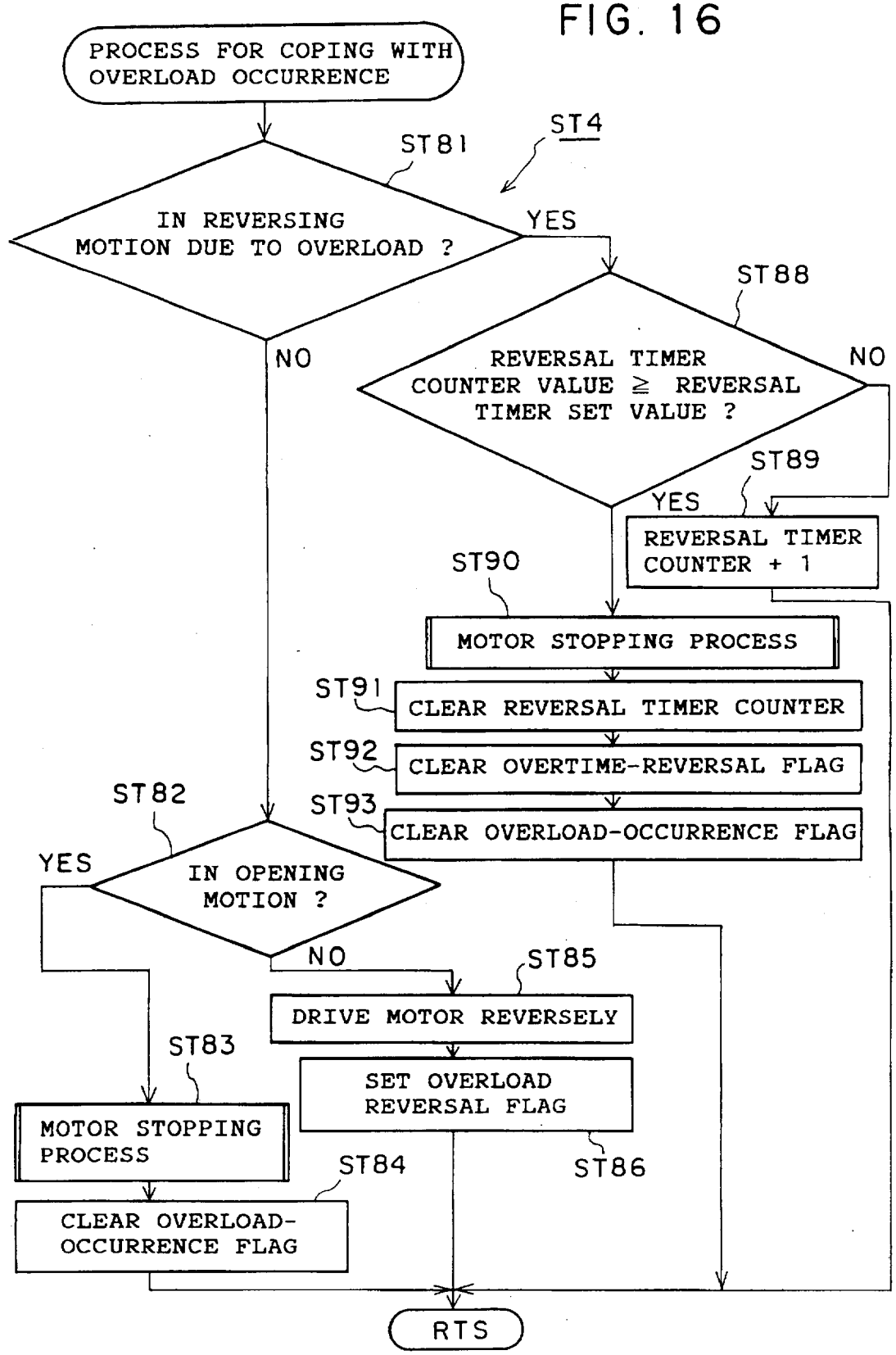
FIG. 16 is a flowchart showing a process coping with overload occurrence.

Now, the process coping with overload occurrence in step ST4 will be described with reference to the flowchart of FIG. 16. The process in step ST4 is started when the overload-occurrence flag is turned on. First, in step ST81, the microcomputer 8 determines whether the sunroof panel is in reversing motion due to an overload detected. If it is not in such reversing motion, the microcomputer 8 determines whether it is in its opening movement (step ST82). Since an overload occurring in an opening movement is not that caused by intrusion of foreign matter, it is not necessary to reverse the rotation of the motor 11. Accordingly, the microcomputer 8 performs a process to stop the motor 11 and clears the overload-occurrence flag (step ST83, step ST84). More specifically, an overload during an opening operation is not that caused by intrusion of foreign matter but that caused by a bite in the sliding portion of the sunroof panel or the like, and therefore, no reversing motion is made and the process coping with overload occurrence is ended.

When the sunroof panel is in its closing movement, the microcomputer 8 turns off the drive transistor 36 and turns on the drive transistor 35 to reverse the motor 11 (step ST85). Then, in step ST86, it sets an overload-reversal flag. The overload-reversal flag serves as the flag used in step ST81 for determining whether the sunroof panel is making reversing motion due to an overload detected.

When it is judged that such reversal movement is taking place in step ST81, step ST88 follows. In step ST88, the microcomputer 8 checks the count value of a reversal timer counter for use in controlling the time for reversal movement. When the count value of the reversal timer counter is smaller than a preset value, the counter value is provided with an increment of one (step ST89).

When, in step ST88, the count value of the reversal timer counter is larger than or equal to the preset value, step ST90 follows. In step ST90, the microcomputer 8 judges that the sunroof panel has made the reversal movement for the preset period of time and performs the process to stop the motor 11. This process is the same as that performed in step ST83. Thereafter, the reversal timer counter, the overload-reversal flag, and the overload-occurrence flag are cleared and the process coping with overload occurrence is ended (steps ST91, ST92, and ST93).

Figure 17:
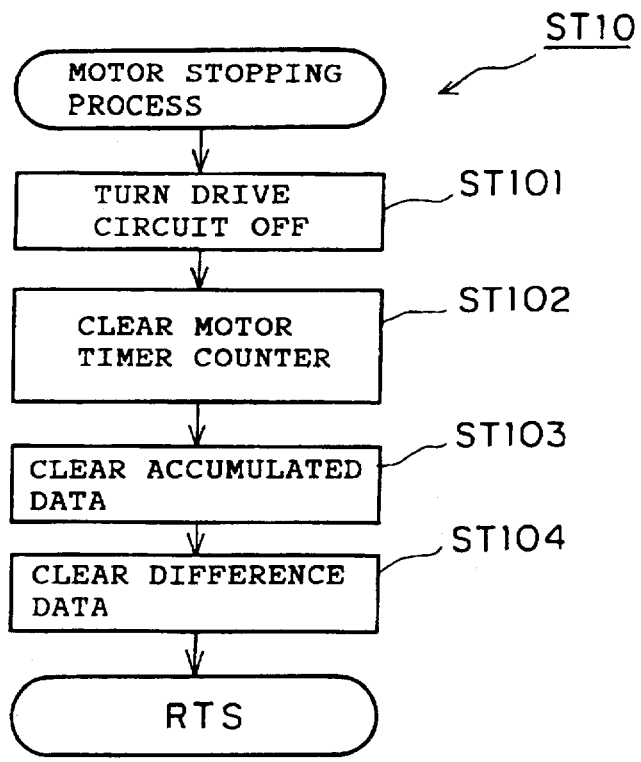
FIG. 17 is a flowchart showing a motor stopping process.

The motor stopping process in step ST10 will be described with reference to the flowchart of FIG. 17. First, in step ST101, the microcomputer 8 turns off the drive circuit 30 and stops the drive of the motor 11. Then, it clears the motor timer counter that was counted out in step ST74 (step ST102). Further, it clears the accumulated data stored in step ST49 and clears the difference data stored in step ST51 (steps ST103, ST104).

Embodiment 2

Figure 18:
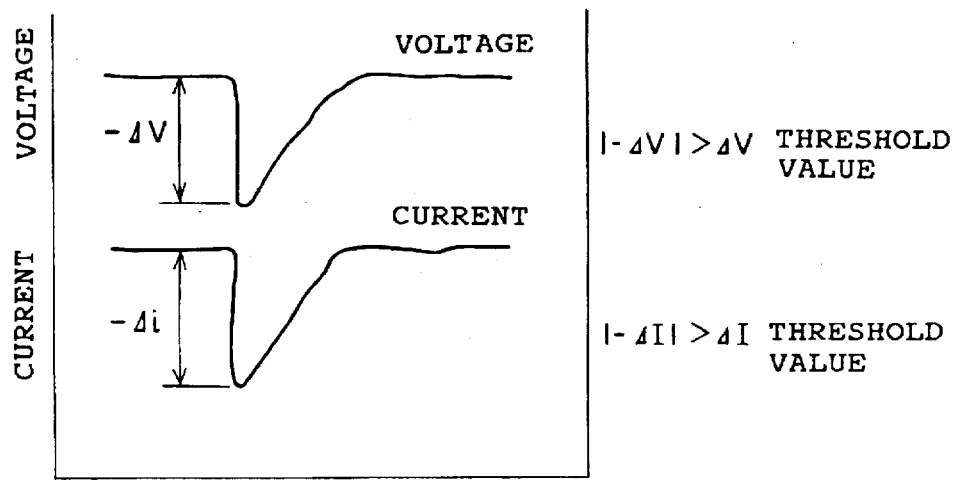
FIG. 18 is a waveform chart showing an applied voltage to a motor and a driving current for the motor when cranking has been performed.

Another method for detecting cranking will be described with reference to FIG. 18 and FIG. 19. FIG. 18 is an enlarged view of part of the waveform chart shown in FIG. 5 and it shows the voltage applied to the motor 11 and the driving current for it when cranking has been made. Occurrence of cranking is judged by detecting decreases in the applied voltage and the driving current produced when cranking is made.

Figure 4:
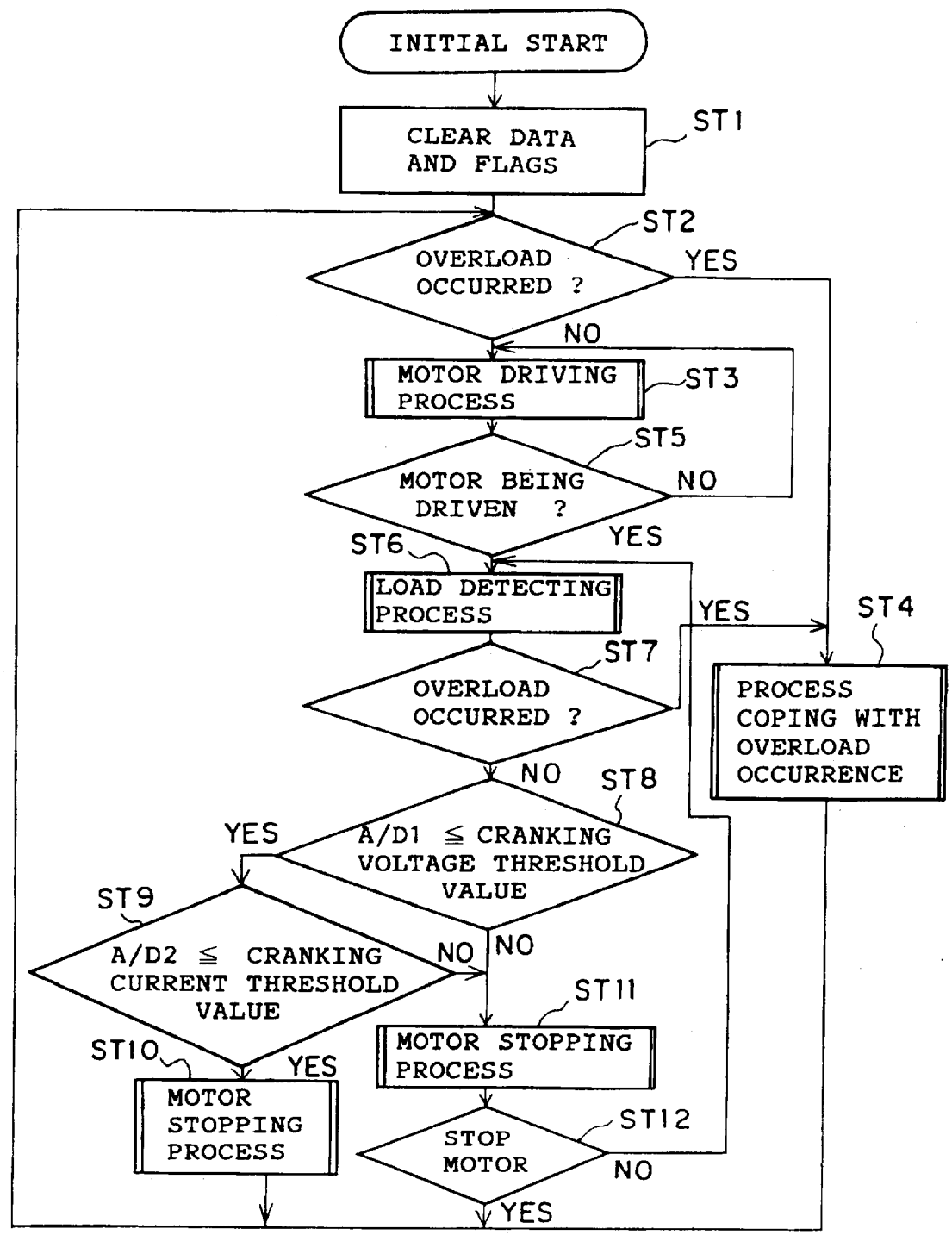
FIG. 4 is a flowchart showing operations of the control apparatus of a motor-driven opening/closing member of a vehicle according to the first embodiment of the invention.
Figure 19:
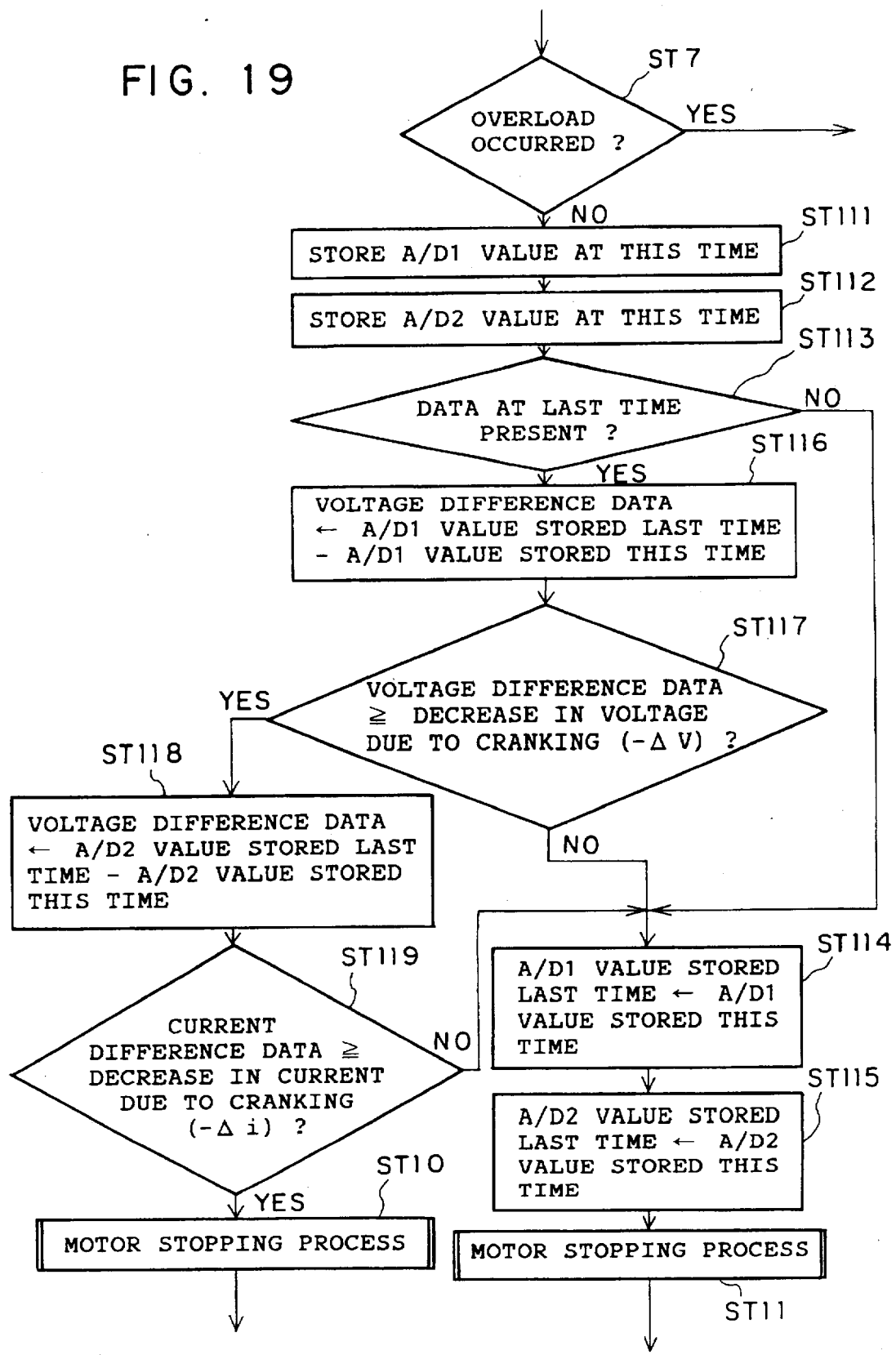
FIG. 19 is a flowchart showing operations of a control apparatus of a motor-driven opening/closing member of a vehicle according to a second embodiment of the invention.

The flowchart of FIG. 19 is that corresponding to the cranking detecting portion in the flowchart of FIG. 4. Operations of the entire apparatus are constituted of the processes performed in steps before step ST7 and the process performed in step ST12 of the flowchart of FIG. 4 and the processes shown in FIG. 19.

First, in step ST111, the microcomputer 8 takes in the value appearing at the #1 A-D port (applied voltage) at the moment (at this time) and places it into storage. Then, in step ST112, it takes in the value present at the #2 A-D port (driving current) at this time and places it into storage. In step ST113, the microcomputer 8 determines whether the value at the #1 A-D port and the value at the #2 A-D port are placed in storage (step ST113). If the value at the #1 A-D port and the value at the #2 A-D port are not placed in storage, it directly moves to step ST114. In step ST114, the microcomputer 8 stores the value at the #1 A-D port at this time as the value at the #1 A-D port at the last time and, in step ST115, it stores the value at the #2 A-D port at this time as the value at the #2 A-D port at the last time.

When the value at the #1 A-D port at the last time and the value at the #2 A-D port at the last time are both placed in storage, step ST116 follows. In step ST116, the microcomputer 8 stores, as voltage difference data, the difference between the value at the #1 A-D port stored the last time and the value at the #1 A-D port stored this time. In step ST117, it determines whether the absolute value of the voltage difference data is larger than the absolute value of the threshold value of voltage decrease due to cranking, $-\Delta V$ (for example 3V). When the absolute value of the voltage difference data is smaller than the absolute value of the threshold value of voltage decrease due to cranking, $-\Delta V$, the microcomputer 8 judges that the cranking is not taking place and advances to step ST114. When, in step ST117, the absolute value of the voltage difference data is larger than or equal to the absolute value of the threshold value of voltage decrease due to cranking, $-\Delta V$, it judges that there is the possibility of cranking taking place and moves to step ST118.

In step ST118, the microcomputer 8 stores, as current difference data, the difference between the value at the #2 A-D port stored the last time and the value at the #2 A-D port stored this time. In step ST119, the microcomputer 8 determines whether the absolute value of the current difference data is larger than the absolute value of the threshold value of current decrease due to cranking, $-\Delta i$ (for example 2A). When the absolute value of the current difference data is smaller than the absolute value of the threshold value of current decrease due to cranking, $-\Delta i$, it moves to step ST114. When, in step ST119, the absolute value of the current difference data is larger than or equal to the absolute value of the threshold value of current decrease due to cranking, $-\Delta i$, the microcomputer 8 judges that cranking is taking place and advances to step ST10 to perform the process to stop the motor 11.

Embodiment 3

Figure 20:
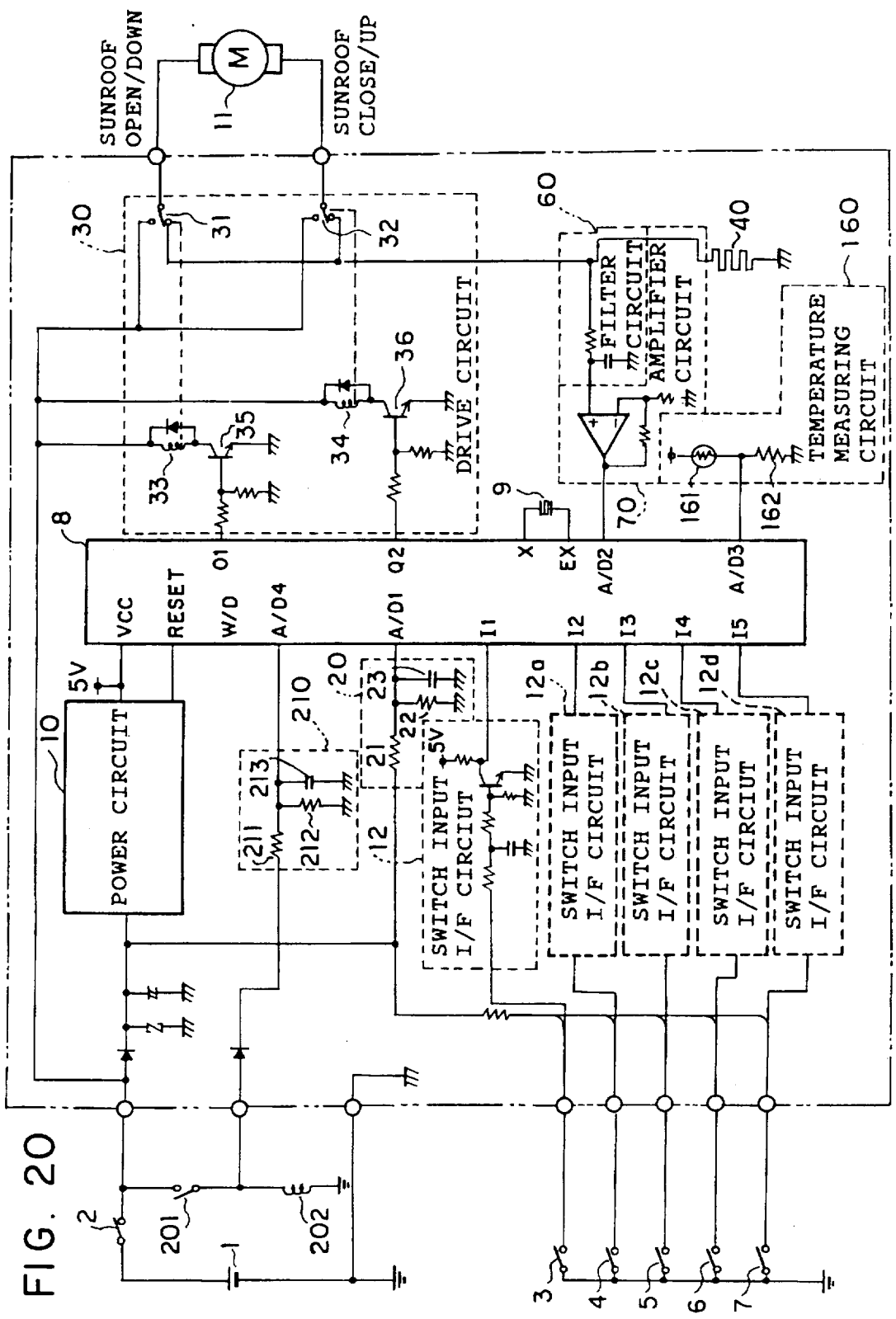
FIG. 20 is a circuit diagram showing a control apparatus of a motor-driven opening/closing member of a vehicle according to a third embodiment of the invention.

FIG. 20 is a circuit diagram showing a structure of the circuit shown in FIG. 1 with a circuit for inputting a starter signal added thereto. Referring to FIG. 20, reference numeral 201 denotes a starter switch and 202 denotes a starter coil. Reference numeral 210 denotes an interface circuit for inputting the state of the starter switch (starter signal) to the #4 A-D port (A/D4) of the microcomputer 8 and it includes resistors 211 and 212 for voltage-dividing the voltage across the starter coil 202 at the time the starter switch 201 is turned on and a capacitor 213 for absorbing noises. The #4 A-D port is an analog-to-digital conversion port of the microcomputer 8.

Operation of the starter portion shown in FIG. 20 will be described. The starter switch 201 is normally off and is turned on only when the vehicle engine is started. Normally, the input voltage at the #4 A-D port of the microcomputer 8 is pulled down to the ground level through the resistor 212. When the starter switch 201 is turned on, a current flows through the starter coil 202 and a voltage is generated at the starter coil 202. The voltage is divided by the resistors 211 and 212 and smoothed by the capacitor 213 to be then input to the #4 A-D port. Accordingly, the microcomputer 8 can detect the on/off state of the starter switch 201 from the value at the #4 A-D port.

Figure 21:
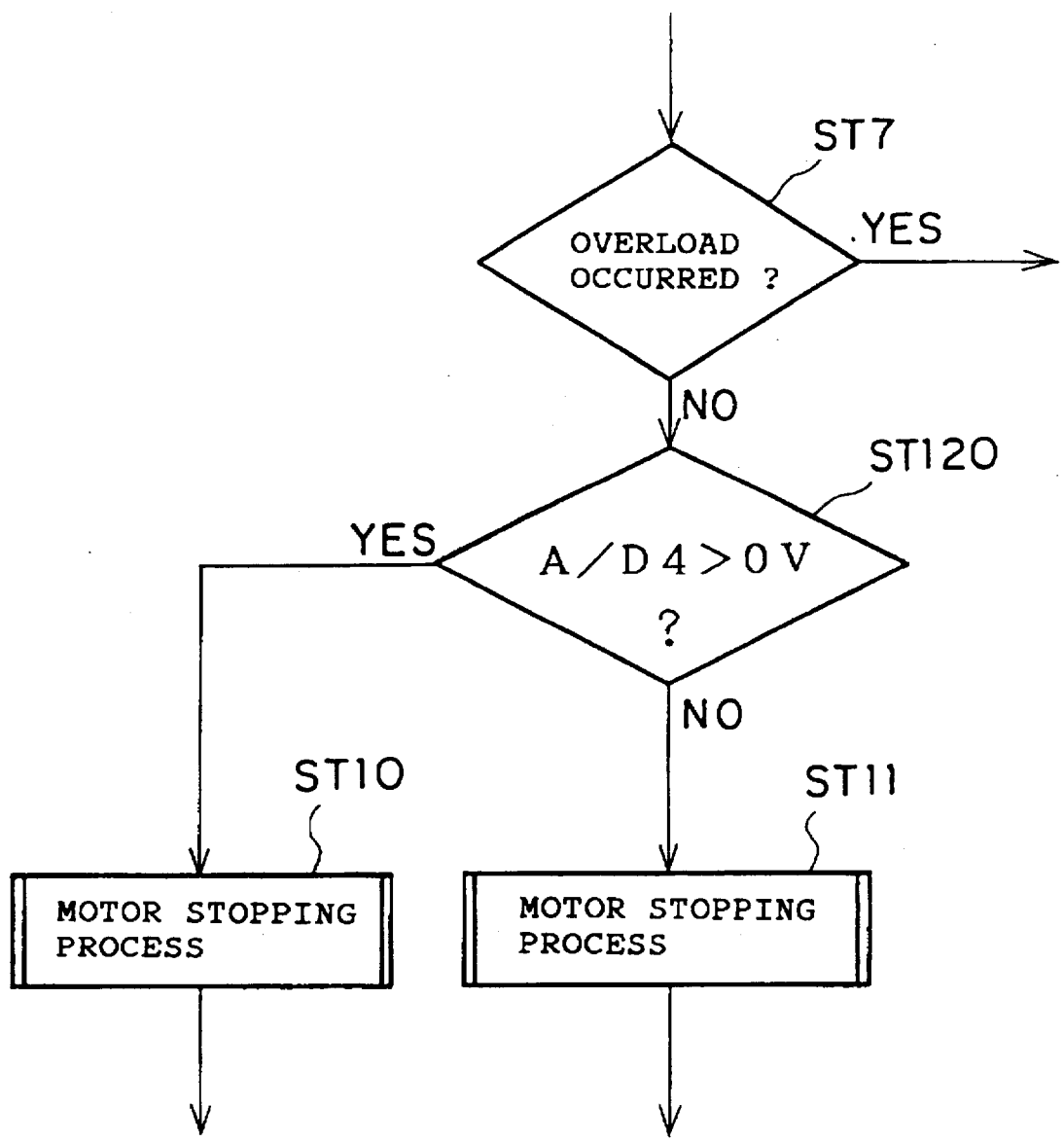
FIG. 21 is a flowchart showing operations of the control apparatus of a motor-driven opening/closing member of a vehicle according to the third embodiment of the invention.
Figure 22:
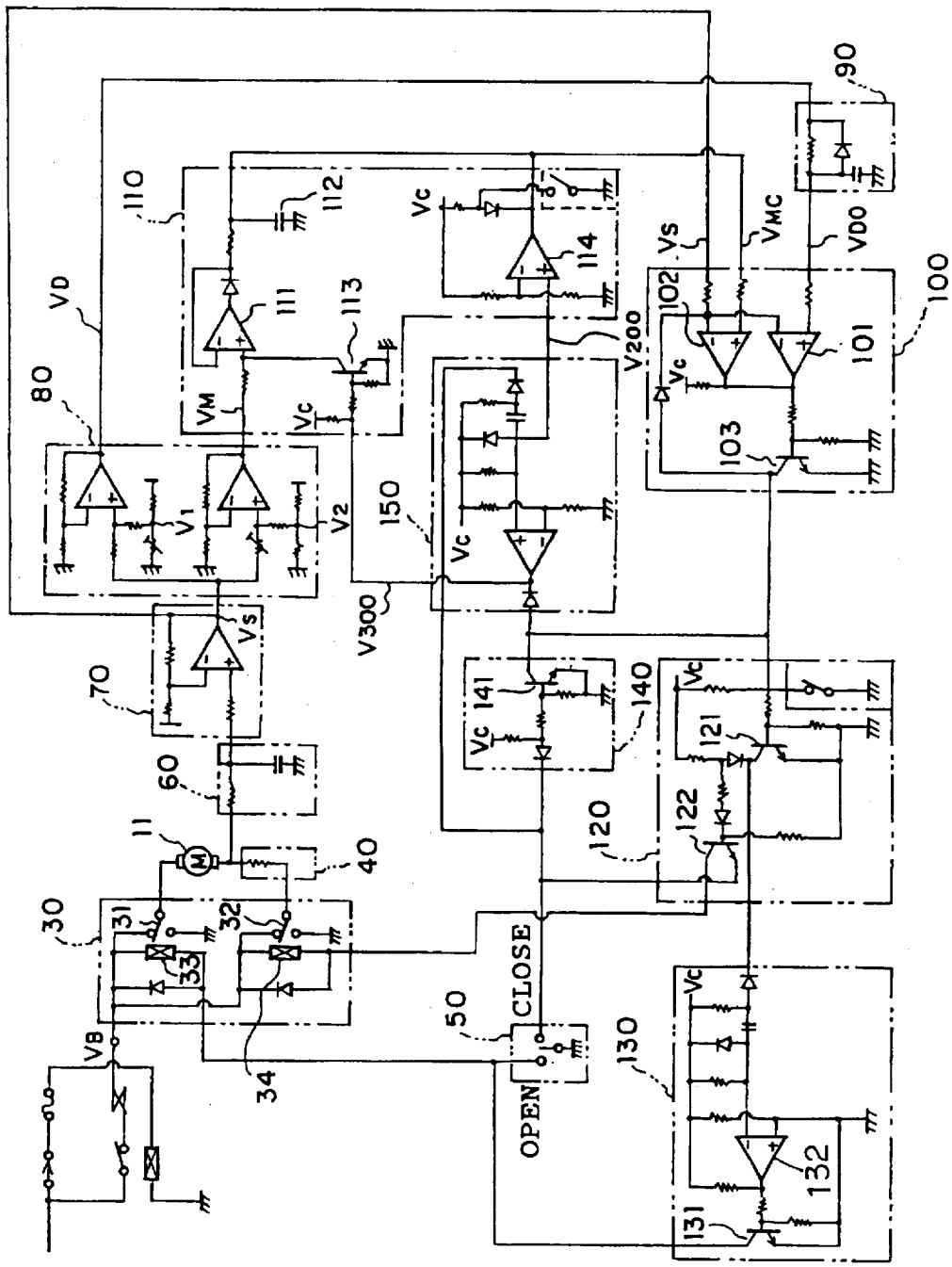
FIG. 22 is a circuit diagram showing a safety apparatus for the automobile sunroof to which a conventional method of controlling opening/closing of a motor-driven opening/closing member of a vehicle is applied.

The method for detecting cranking by detecting the on/off state of the starter switch 201 will be described with reference to the flowchart of FIG. 21. The flowchart of FIG. 21 is that corresponding to the cranking detecting portion in the flowchart of FIG. 4. Operations of the entire apparatus are constituted of the processes performed in steps before step ST7 and the process performed in step ST12 of the flowchart of FIG. 4 with the processes shown in FIG. 21 added together.

In step ST120, the microcomputer 8 takes in the voltage at the #4 A-D port. If the value at the #4 A-D port is of the ground level, it means that the starter switch 201 is not on and, therefore, it advances to step ST11. If a significant voltage appears at the #4 A-D port, it means that the starter switch 201 is on. In such case, the microcomputer 8 advances to step ST10 to perform the process to stop the motor 11.

In the above description, the control to stop the motor 11 has been executed when cranking has been detected. The reason for that is because, in a state of cranking taking place, the motor 11 comes to stop if the voltage drop in the battery 1 is so great that the battery cannot supply voltage enough to operate the control unit and the motor 11. However, in the event of cranking taking place, if the voltage drop is within such a range as to enable the control unit and the motor 11 to operate well, it is possible not to stop but to continue the drive of the motor 11.

As described above, by executing control such that the overload threshold value is corrected to a larger value when the value of the driving current for the motor is not smaller than the preset current value in the comparison of these values with each other, correct detection of an overload state can be ensured, even if the irregularities of the sliding load resistance become greater by aged deterioration or the like, and such a malfunction that the sunroof panel is reversed on an occasion other than occurrence of an overload can be prevented.

Also, by arranging such that the overload threshold value is corrected to a higher value when the ambient temperature is determined to be lower than the preset temperature when these temperatures are compared with each other, an overload state can be positively detected even when the irregularities of the sliding load resistance become greater under the low temperature condition, and, thereby, such a malfunction that the sunroof panel is reversed on an occasion other than occurrence of an overload can be prevented.

Also, by arranging such that the interval of detection of the driving current for the motor is corrected to a longer period when either of the applied voltage and the ambient temperature is lower than the set value or the driving current is not smaller than the set value in the comparison of the applied voltage to the motor, the driving current for the motor, and the ambient temperature with the preset voltage value, the preset current value, and the preset temperature value, respectively, correct overload detection can be ensured.

When a change in the current flow is canceled if the change in the current flow detected at intervals of a second period longer than a predetermined period is smaller than a preset value, and a change in the current flow is maintained if the change in the current flow is not smaller than the preset value and a change in the current flow then detected is added to the maintained value, then, correct detection of an overload can be ensured and such a malfunction that the sunroof panel is reversed on an occasion other than occurrence of an overload can be prevented.

When the detecting interval is determined according to the ambient temperature, correct overload detection can be ensured even when the sliding load resistance of the sunroof panel varies with changes in the temperature.

When the detecting interval is determined according to the voltage applied to the motor, correct overload detection can be ensured even when the number of revolutions and the torque of the motor are varied by the change in the voltage.

When the detecting interval is determined according to the driving current for the motor, correct overload detection can be ensured even when the sliding load resistance of the sunroof panel is changed by aged deterioration.

When cranking is judged to have taken place if the voltage applied to the motor and the driving current for the motor have become lower than preset values, wrong detection of an overload during a cranking operation can be prevented positively.

Also, when cranking is judged to have taken place if the decreases in the voltage applied to the motor and the driving current for the motor have reached or exceeded preset values, wrong detection of an overload during a cranking operation can be positively prevented.

Also, when cranking is judged to have taken place if making signal of the starter switch has been detected, wrong detection of an overload during a cranking operation can be positively prevented.

What is claimed is:

1. A method of controlling opening/closing of a motor-driven movable member of a vehicle comprising the steps of:

detecting a driving current of a motor for driving the movable member, at predetermined detecting intervals;

calculating a change in the driving current at each of the detecting intervals;

adding the change in the driving current in successive detection intervals to provide a total current change value;

comparing the total current change value with a previously set overload threshold value and performing one of stopping the motor and stopping the motor after reversing rotation of the motor, when the total current change value is not smaller than the overload threshold value; and determining the detecting interval or the overload threshold value on the basis of environmental conditions.

2. A method of controlling opening/closing of an on-vehicle motor-driven movable member of a vehicle according to claim 1, wherein said step of determining the overload threshold value includes the step of:

comparing the driving current value detected when an operation masking period has past after the start of the motor with a previously set current value and correcting the overload threshold value to a higher value when the driving current value is not smaller than the preset current value.

3. A method of controlling opening/closing of a motor-driven movable member of a vehicle according to claim 1, wherein said step of determining the overload threshold value includes the step of:

comparing ambient temperature with a previously set temperature and correcting the overload threshold value to a higher value when the ambient temperature does not exceed the preset temperature.

4. A method of controlling opening/closing of a motor-driven movable member of a vehicle according to claim 1, wherein said step of determining the detecting interval includes the step of:

comparing applied voltage to the motor, driving current for the motor, and ambient temperature with preset voltage value, preset current value, and preset temperature value, respectively, and establishing a second detecting interval longer than the previously set detecting interval when at least one of the applied voltage and the ambient temperature does not exceed the preset value and when the driving current is not smaller than the preset value.

5. A method of controlling opening/closing of a motor-driven movable member of a vehicle according to claim 1, wherein said step of comparing the change in the driving current with a previously set overload threshold value includes the step of:

canceling a change in the current detected at a second detecting interval when the detected change in the current is smaller than a previously set value, while maintaining the change in the current when the change in the current is not smaller than the previously set value and adding a change in the current subsequently detected to the maintained change in the current.

6. A method of controlling opening/closing of a motor-driven movable member of a vehicle according to claim 4, wherein said step of determining the detecting interval includes the step of:

determining the detecting interval on the basis of the ambient temperature.

7. A method of controlling opening/closing of a motor-driven movable member of a vehicle according to claim 4, wherein said step of determining the detecting interval includes the step of:

determining the detecting interval on the basis of the voltage applied to the motor.

8. A method of controlling opening/closing of a motor-driven movable member of a vehicle according to claim 4, wherein said step of determining the detecting interval includes the step of:

determining the detecting interval on the basis of the driving current for the motor.

9. A method of controlling opening/closing of a motor-driven movable member of a vehicle according to claim 1, further comprising the step of:

at least one of stopping the motor and inhibiting execution of overload detection, when values of the voltage applied to the motor and the driving current for the motor have become smaller than previously set values taking the events as indications of occurrence of cranking.

10. A method of controlling opening/closing of a motor-driven movable member of a vehicle according to claim 1, further comprising at least one of the steps of:

stopping the motor when decreases in the voltage applied to the motor and the driving current for the motor have exceeded previously set values taking the events as indications of occurrence of cranking; and inhibiting execution of overload detection when decreases in the voltage applied to the motor and the driving current for the motor have exceeded previously set values taking the events as indications of occurrence of cranking.

11. A method of controlling opening/closing of a motor-driven movable member of a vehicle according to claim 1, further comprising the step of:

detecting a signal of a starter switch to thereby determine whether cranking has occurred and performing at least one of stopping the motor and inhibiting execution of overload detection when cranking has occurred.

12. An apparatus for controlling opening/closing of a motor-driven movable member of a vehicle comprising:

a motor for driving said movable member;

current detection means for detecting a driving current for said motor;

a control circuit calculating a change in the driving current detected by said circuit detection means at predetermined detecting intervals, outputting one of a stop signal to cause said motor to stop and a reverse signal to cause said motor to reverse, when the change has exceeded a previously set overload threshold value, said control circuit further responsive to start operation of the motor to monitor a masking period and, after the masking period has passed, compare the driving current with a previously set value for selecting a higher overload threshold value from stored overload threshold values when the driving current value is not smaller than the present current value; and a driving circuit responsive to said control circuit for driving said motor.

13. An apparatus for controlling opening/closing of a motor-driven movable member of a vehicle according to claim 12, further comprising:

a temperature detector for detecting ambient temperature, wherein said control circuit accepts the ambient temperature detected by said temperature detector and compares the ambient temperature with a previously set temperature for correcting the overload threshold value to a higher value when the ambient temperature is lower than the preset temperature.

14. An apparatus for controlling opening/closing of a motor-driven movable member of a vehicle according to claim 12, wherein said control circuit determines that cranking has occurred when values of the voltage applied to said motor and the driving current thereof have become lower than previously set values.

15. An apparatus for controlling opening/closing of a motor-driven movable member of a vehicle according to claim 12, wherein said control circuit determines that cranking has occurred when decreases in the voltage applied to said motor and the driving current thereof have reached previously set values.

16. An apparatus for controlling opening/closing of a motor-driven movable member of a vehicle according to claim 12, further comprising:

a detector circuit for detecting a make state of a starter switch, wherein said control circuit determines occurrence of cranking according to a make signal sent by said detector circuit.

17. An apparatus for controlling opening/closing of a motor-driven movable member of a vehicle comprising:

a motor for driving said movable member;

current detection circuit for detecting a driving current for said motor;

a control circuit for calculating a change in the driving current detected by said currentdetection circuit at predetermined detecting intervals, for outputting one of a stop signal to cause said motor to stop and a reverse signal to cause said motor to reverse, when the change has exceeded a previously set overload threshold value, said control circuit determining when a masking period has passed after the start of said motor and then compares the detected driving current value with a preset current value for correcting the overload threshold value to a higher value when the driving current value is not smaller than a preset current value, said control circuit further comparing each of applied voltage to said motor, the driving current for said motor, and ambient temperature with a respective preset value, and establishing second detecting interval longer than the previously set detecting interval when at least one of the applied voltage and the ambient temperature does not exceed the respective preset value and when the driving current is not smaller than the preset current value; and a driving circuit responsive to said control circuit for driving said motor.

* * * * *